(12) United States Patent
Ariga et al.

(10) Patent No.: US 12,086,104 B2
(45) Date of Patent: Sep. 10, 2024

(54) DATA MANAGEMENT SYSTEM, DATA MANAGEMENT METHOD, AND COMPUTER-READABLE MEDIUM

(71) Applicant: Evident Corporation, Tatsuno-machi (JP)

(72) Inventors: Naohiro Ariga, Tokyo (JP); Shintaro Takahashi, Tokyo (JP); Hiroya Ishihara, Tokyo (JP); Kentaro Imoto, Tokyo (JP); Norihiro Katsuki, Tokyo (JP); Madoka Kimura, Tokyo (JP)

(73) Assignee: Evident Corporation, Nagano (JP)

( * ) Notice: Subject to any disclaimer, the term of this patent is extended or adjusted under 35 U.S.C. 154(b) by 0 days.

(21) Appl. No.: 17/894,852

(22) Filed: Aug. 24, 2022

(65) Prior Publication Data

US 2023/0063161 A1 Mar. 2, 2023

(30) Foreign Application Priority Data

Aug. 31, 2021 (JP) .................................. 2021-141047

(51) Int. Cl.
*G06F 16/00* (2019.01)
*G06F 3/14* (2006.01)
*G06F 16/16* (2019.01)
*G06V 10/764* (2022.01)

(52) U.S. Cl.
CPC .............. *G06F 16/164* (2019.01); *G06F 3/14* (2013.01); *G06V 10/764* (2022.01); *G06V 2201/10* (2022.01)

(58) Field of Classification Search
CPC ..................................................... G06F 16/164
USPC .......................................................... 707/822
See application file for complete search history.

(56) References Cited

U.S. PATENT DOCUMENTS

2008/0301176 A1 12/2008 Fanelli et al.
2020/0065363 A1* 2/2020 Yamane ................ G06F 40/174

FOREIGN PATENT DOCUMENTS

JP 2020034972 A 3/2020
WO 2006040134 A1 4/2006

OTHER PUBLICATIONS

Extended European Search Report (EESR) dated Feb. 7, 2023, issued in counterpart European Application No. 22193052.2.

* cited by examiner

*Primary Examiner* — Chelcie L Daye
(74) *Attorney, Agent, or Firm* — Holtz, Holtz & Volek PC

(57) ABSTRACT

A data management system includes: an input control unit (110) that adds measurement data uploaded by designating a theme that is a unit of access control and acquired by a measurement system, to a dataset classified based on metadata included in the measurement data, within the theme; a management control unit (120) that associates the dataset with a chapter that is a unit of status management and is provided within the theme; and a display control unit (130) that displays information managed by the data management system.

21 Claims, 21 Drawing Sheets

310

(STEP 1/2)
PLEASE CREATE NEW THEME.

PLEASE ENTER THEME NAME. — 311

PLEASE ASSIGN MEMBER. — 312

Cancel  Next

(STEP 2/2)
PLEASE TELL US ABOUT RESEARCH ON THEME.

DESCRIPTION OF THIS THEME — 321

GOAL OF THIS THEME — 322

HYPOTHESIS ON THIS THEME — 323

Cancel  Create

FIG. 7

PLEASE SELECT CHAPTER

THEME NAME : THEME A

CHAPTER A1

CHAPTER A2

CHAPTER A3

CHAPTER A4

CHAPTER A5

341

Cancel   Select

PLEASE SELECT CHAPTER

THEME NAME : THEME A

∨ Planning
 CHAPTER A5

∨ In Progress
 CHAPTER A3
 CHAPTER A4

∨ Discussion
 CHAPTER A2

> Complete

342

Cancel   Select

DATA MANAGEMENT SYSTEM, DATA MANAGEMENT METHOD, AND COMPUTER-READABLE MEDIUM

CROSS REFERENCE TO RELATED APPLICATIONS

This application is based upon and claims the benefit of priority from prior Japanese Patent Application No. 2021-141047, filed Aug. 31, 2021, the entire contents of which are incorporated herein by this reference.

TECHNICAL FIELD

The disclosure herein relates to a data management system, a data management method, and a computer-readable medium.

BACKGROUND

Various kinds of data obtained during the course of research are important assets related to research activities, and appropriate acquisition thereof is highly expected. A technique related to such an acquisition is described in, for example, JP 2020-034972 A.

JP 2020-034972 A describes a technique for creating an experiment note by using log data in addition to information such as image data and analysis results. According to the technique described in JP 2020-034972 A, data can be appropriately acquired by recording various kinds of data obtained during the course of research as experiment notes.

SUMMARY

A data management system according to an aspect of the present invention includes: a processor, wherein the processor is configured to: add measurement data uploaded by designating a theme that is a unit of access control and acquired by a measurement system, to a dataset classified based on metadata included in the measurement data, within the theme; associate the dataset with a chapter that is a unit of status management and is provided within the theme; and display information managed by the data management system.

A data management method according to an aspect of the present invention is a data management method performed by a computer of a data management system, which includes: adding measurement data uploaded by designating a theme that is a unit of access control and acquired by a measurement system, to a dataset classified based on metadata included in the measurement data, within the theme; associating the dataset with a chapter that is a unit of status management and is provided within the theme; and displaying information managed by the data management system.

A computer-readable medium according to an aspect of the present invention is a non-transitory computer-readable medium having a program recorded thereon, in which the program causes a computer of a data management system to execute a process, the process including: adding measurement data uploaded by designating a theme that is a unit of access control and acquired by a measurement system, to a dataset classified based on metadata included in the measurement data, within the theme; associating the dataset with a chapter that is a unit of status management and is provided within the theme; and displaying information managed by the data management system.

BRIEF DESCRIPTION OF DRAWINGS

The present invention will be more apparent from the following detailed description when the accompanying drawings are referenced.

FIG. 6 is a diagram illustrating an example of a window 310 displayed when a theme is created.

FIG. 7 is a diagram illustrating an example of another window 320 displayed when a theme is created.

DESCRIPTION OF EMBODIMENTS

The use of the acquired various kinds of data is also extremely important. However, the various kinds of data obtained during the course of research have so far often been managed by individual researchers, which makes it difficult for other researchers to use the data, and consequently hinders the promotion of use of the data.

Considering such circumstances, an embodiment of the present invention will be described hereinafter.

Figure 1:
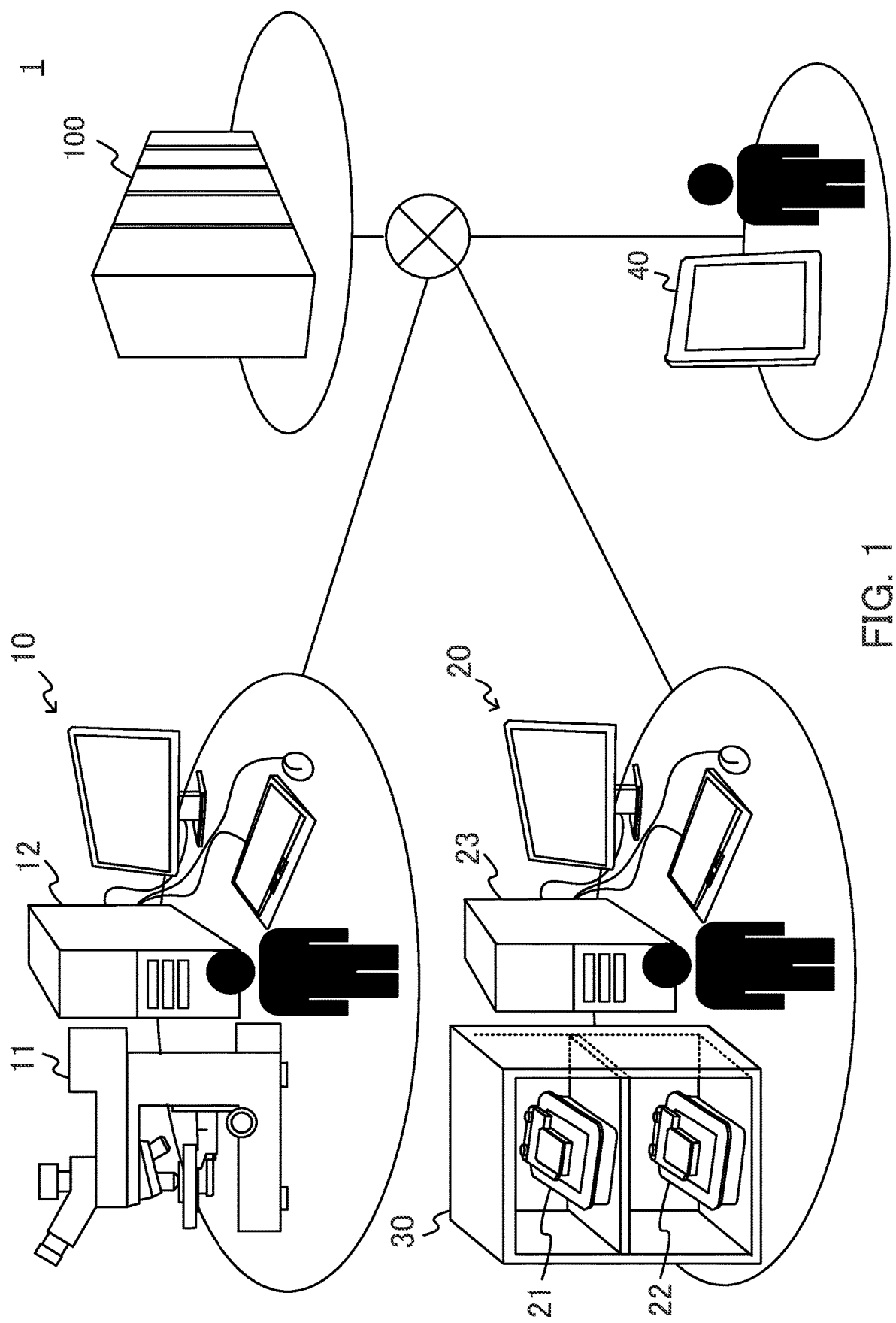
FIG. 1 is a diagram illustrating an example of a configuration of a system 1.

FIG. 1 is a diagram illustrating an example of a configuration of a system 1 according to an embodiment. The system 1 enables a plurality of users to appropriately cooperate on the system 1 by sharing data obtained by various experiments among the plurality of users. Thus, a data management function and a collaboration function necessary for achieving research purposes are provided.

As illustrated in FIG. 1, the system 1 includes: a server device 100 which is an example of a data management system; a microscope system 10 and a culture monitoring system 20 which are examples of a measurement system; and one or more client devices 40, all of which are connected to each other via a network.

The type of the network is not particularly limited. For example, the network may be a public network such as the Internet, a dedicated network, or a local area network (LAN). The connection between the server device 100, the microscope system 10, the culture monitoring system 20, and the client device 40 may be a wired connection or a wireless connection. Note that a case where the server device 100 is a cloud server device placed over the Internet will be described below as an example.

The server device 100 is a system that manages measurement data obtained by experiments or others performed by the measurement system. The server device 100 can organize and manage the measurement data to provide the client device 40 with efficient access to a large amount of measurement data obtained through experiments and appropriate access control. The measurement data is not limited to experimental data obtained in an experiment, and may be data measured for a purpose other than the experiment.

The server device 100 creates and manages a digital note (hereinafter simply referred to as a note) in which details of an experiment performed by the measurement system, consideration obtained through the experiment, and others are written. Images, metadata, and others included in the measurement data can be added to the note, and a note can be created efficiently using the measurement data.

Further, the server device 100 is provided with a chat function, and can promote a discussion among a plurality of users using notes and measurement data as subjects. The server device 100 also provides a function of managing the status of various projects that occur for research purposes.

The microscope system 10 includes a microscope 11 and a control device 12 that controls the microscope 11. The microscope 11 is, but not particularly limited to, a fluorescence microscope, for example, a laser scanning microscope.

The culture monitoring system 20 includes one or more cell monitors (a cell monitor 21 and a cell monitor 22) that are imaging devices that perform time-lapse imaging in an incubator 30, and a control device 23 that controls the cell monitors. In order to image a sample such as cells placed in a culture state without taking out the sample from the incubator 30, the cell monitor is used, for example, in a state of being disposed in the incubator 30.

The client device 40 is a device used by a user of the system to access the server device 100. The client device 40 only needs to include at least an input device, a display device, and a communication device. For example, the client device 40 is a tablet computer as illustrated in FIG. 1, but may be a desktop computer or a laptop computer. The control device 12 of the microscope system 10 and the control device 23 of the culture monitoring system 20 may function as client devices.

Figure 2:
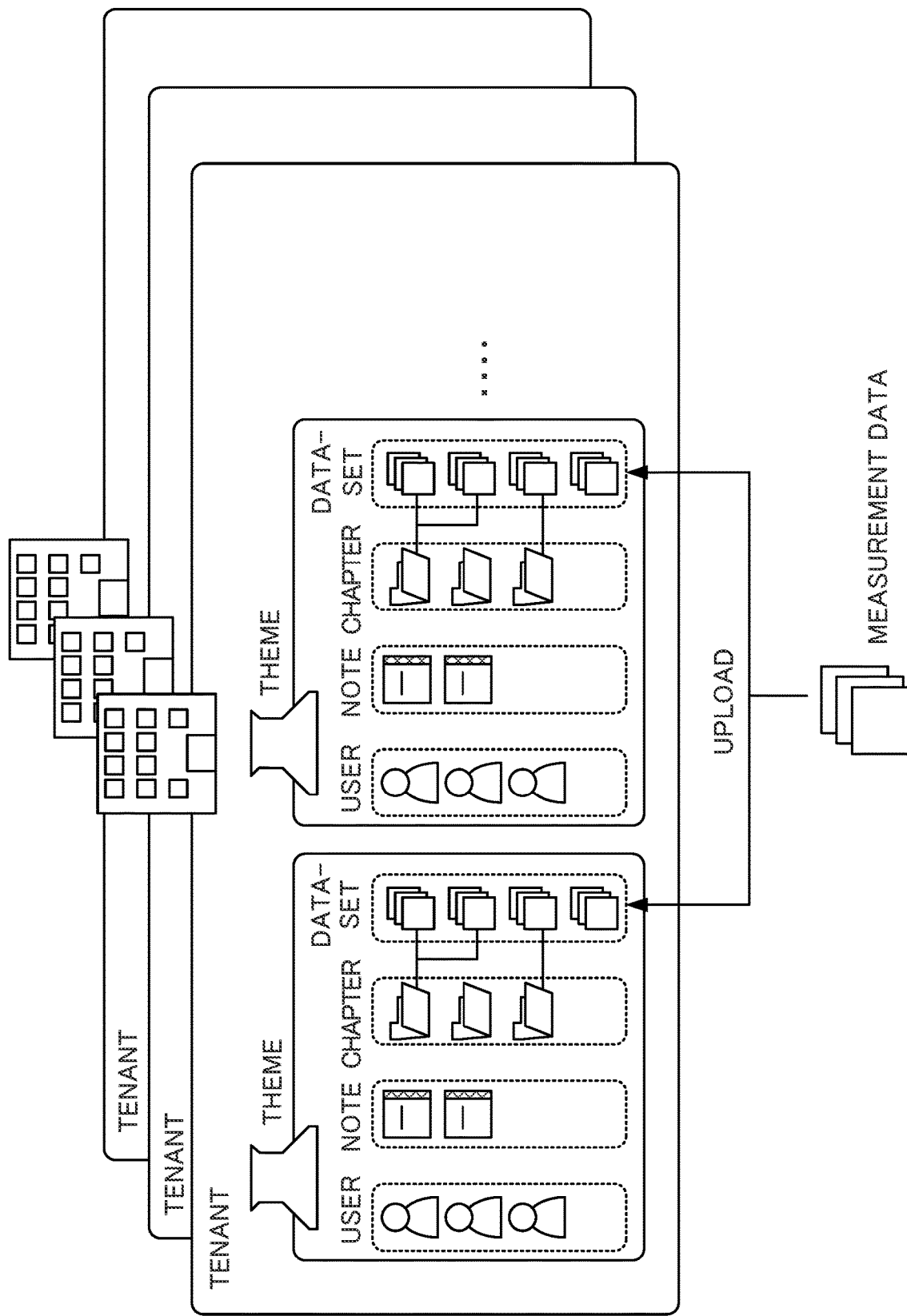
FIG. 2 is a diagram illustrating an example of a data management structure in a server device 100.

FIG. 2 is a diagram illustrating an example of a data management structure in the server device 100. The highest hierarchy of the data management structure of the server device 100 is a tenant. A tenant is a unit of providing a service, and is provided to a specific client organization, for example. A plurality of tenants each corresponds to a different cloud storage, and thus data access between the tenants is not possible.

The lower hierarchy of the tenant is a theme. The theme delimits the range of information sharing within the tenant and corresponds to, for example, the above-described research purposes. Belonging the user to each theme controls access to data within the theme at the user level. In other words, a theme is a unit of access control.

The lower hierarchy of the theme contain users, notes, chapters, and datasets. A note is used to write the details of the experiment and the consideration obtained through the experiment. Only the user belonging to the theme can access the note by creating the note within the theme, and discussion between users through the note is possible.

A chapter delimits data within a theme. A chapter corresponds to, for example, various projects generated for research purposes, and is also used as a unit of status management. Measurement data uploaded from the measurement system to the server device 100 is added to a dataset. A dataset is a collection of measurement data, and a large amount of images obtained in experiments can be collectively stored. A dataset can be associated with a chapter.

Figure 3:
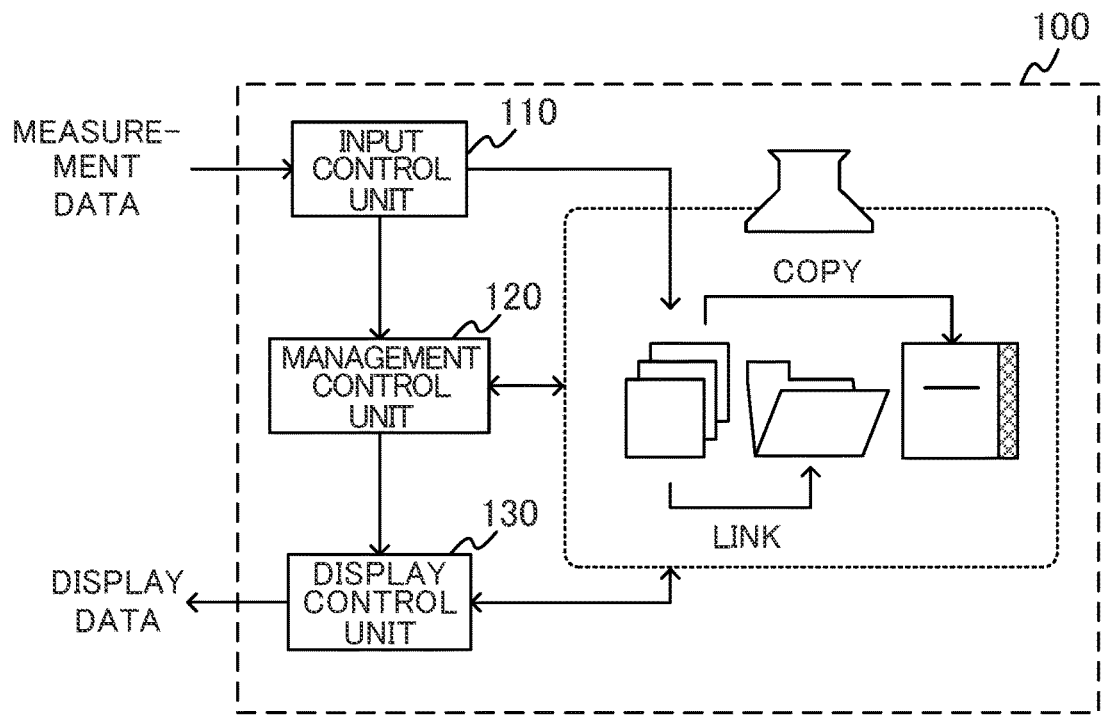
FIG. 3 is a diagram illustrating an example of a functional configuration of the server device 100.

FIG. 3 is a diagram illustrating an example of a functional configuration of the server device 100. As illustrated in FIG. 3, the server device 100 includes an input control unit 110, a management control unit 120, and a display control unit 130. A flow from input of measurement data to the server device 100 to output of display data to the client device 40 will be described below with reference to FIG. 3.

The measurement system designates a theme which is a unit of access control, and uploads measurement data to the server device 100. Thus, the shared range of the measurement data by the server device 100 can be controlled to an appropriate range.

In the server device 100 having received the measurement data, the input control unit 110 then adds the measurement data to a dataset classified based on metadata included in the measurement data, within the designated theme. Thus, a large amount of data can be efficiently collected.

Specifically, the input control unit 110 performs classification according to the content of a specific item (e.g., "ExperimentName") of the metadata. For example, the input control unit 110 may add the measurement data to a dataset having the same name as the content of "ExperimentName".

The management control unit 120 then associates the dataset to which the measurement data is added with the chapter provided within the theme. Specifically, the management control unit 120 associates a dataset with a specific chapter in accordance with an explicit instruction from the user. A dataset is, for example, exclusively associated with a chapter. Thus, the timing of collecting data and the timing of organizing the data can be separated.

In other words, in the server device 100, the input control unit 110 and the management control unit 120 can perform more detailed data organization at an arbitrary timing in accordance with a user instruction while organizing data at a level at which access control is necessary at the time of data collection (at the time of uploading).

The display control unit 130 displays information managed by the server device 100. Specifically, in response to a request from the client device 40, the display control unit 130 creates display data using data such as various themes, notes, chapters, and datasets managed by the server device 100, and transmits the display data to the client device 40.

For example, in the server device 100, the management control unit 120 can manage a note created within a theme, and the display control unit 130 can display a user interface for adding measurement data to a digital note.

In the server device 100 configured as described above, measurement data is allocated to a theme which is a unit of access control at the time of uploading, and is further collectively managed as a dataset based on metadata. A dataset can be later associated with a chapter, which is a unit of status management. Thus, it is possible to organize without imposing an excessive burden on a user such as a researcher while reliably performing access control to measurement data which is an important asset. Therefore, the server device 100 can provide the user with a new mechanism for appropriately managing and sharing data among a plurality of users.

Figure 4:
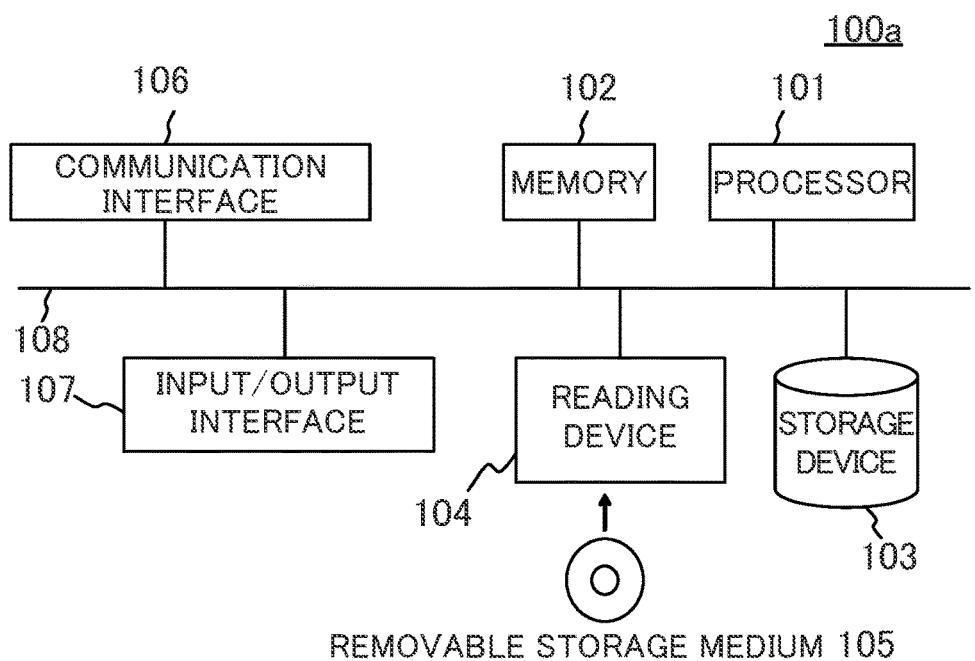
FIG. 4 is a diagram illustrating an example of a hardware configuration of a computer 100a for achieving the server device 100.

FIG. 4 is a diagram illustrating an example of a hardware configuration of a computer 100a for achieving the server device 100. The hardware configuration illustrated in FIG. 4 includes, for example, a processor 101, a memory 102, a storage device 103, a reading device 104, a communication interface 106, and an input/output interface 107. Note that the processor 101, the memory 102, the storage device 103, the reading device 104, the communication interface 106, and the input/output interface 107 are connected to one another, for example, via a bus 108.

The processor 101 reads and executes a program stored in the storage device 103, to operate as the input control unit 110, the management control unit 120, and the display control unit 130 described above.

For example, the memory 102 is a semiconductor memory, and may include a RAM area and a ROM area. For example, the storage device 103 is a hard disk, a semiconductor memory such as a flash memory, or an external storage device.

For example, the reading device 104 accesses a storage medium 105 in accordance with an instruction of the processor 101. For example, the storage medium 105 is achieved by a semiconductor device, a medium to/from which information is input/output by a magnetic action, or a medium to/from which information is input/output by an optical action.

The communication interface 106 communicates with other devices, for example, in accordance with the instruction of the processor 101. The input/output interface 107 is an interface, for example, between an input device and an output device. The input control unit 110 and the display control unit 130 described above may include at least one of the communication interface 106 or the input/output interface 107.

The program to be executed by the processor 101 is provided to the computer 100a, for example, in the following forms.
(1) Installed in the storage device 103 in advance
(2) Provided by the storage medium 105
(3) Provided from a server such as a program server Note that the hardware configuration of the computer 100a for achieving the server device 100 described with reference to FIG. 4 is merely an example, and the embodiment is not limited thereto. For example, the above-mentioned configuration may be partially deleted, or a new constituent may be added thereto. Moreover, in another embodiment, for example, a part or all of the functions of the above-mentioned electric circuit may be implemented as hardware by a field programmable gate array (FPGA), a system-on-a-chip (SoC), an application specific integrated circuit (ASIC), a programmable logic device (PLD), and the like.

With reference to FIGS. 5 to 28, a service provided by the server device 100 to the client device 40 will be described below in detail with specific user interfaces.

Figure 5:
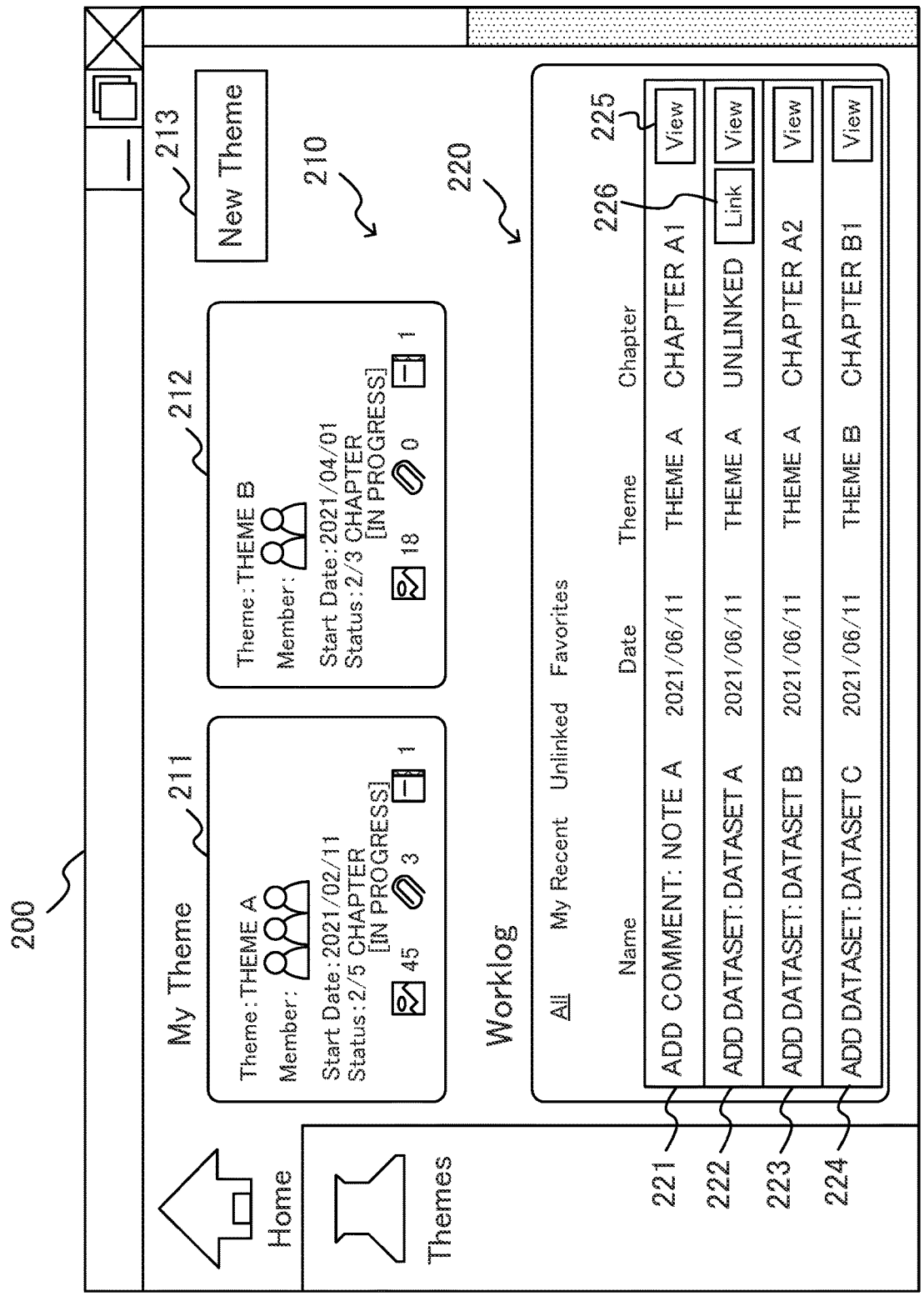
FIG. 5 is a diagram illustrating an example of a state in which a home tab is selected within a window 200.

FIG. 5 is a diagram illustrating an example of a state in which a home tab is selected within a window 200. When the user accesses the server device 100 using the client device 40 and logs in to the service provided by the server device 100, the window 200 illustrated in FIG. 5 is displayed on the client device 40.

In the home tab, the window 200 is divided into a theme list area 210 and a log area 220. The theme list area 210 is an area in which themes to which a user who has logged in (hereinafter referred to as a logged-in user) belongs are listed. In the theme list area 210, signboards (theme signboard 211 and theme signboard 212) corresponding to respective themes are arranged, and a button 213 for creating a new theme is also provided.

On the theme signboard, a name of the theme ("Theme"), a user ("Member") who can access the theme, a start date of the theme ("Start Date"), the number of chapters in progress within the theme ("Status"), and others are described. The number of images within the theme, the number of attached files, and the number of notes are described beside the icons indicating the images, the attached files, and the notes, respectively.

The logged-in user can confirm the theme list area 210 to grasp the theme to which the user belongs and the outline of the theme at a glance.

FIGS. 6 and 7 are diagrams illustrating examples of windows displayed when a theme is created. In order to start a new theme, the button 213 may be pressed. The logged-in user can easily create a theme by inputting necessary items in the window 310 illustrated in FIG. 6 and the window 320 illustrated in FIG. 7 according to a guidance.

Note that in the window 310, a theme name is input in an input area 311, and a user who can access the theme to be created is selected in a selection area 312. Further, in the window 320, a description of the theme (input area 321), a goal (input area 322), and a hypothesis (input area 323) are input.

The log area 220 is an area in which contents of operations on the theme to which the logged-in user belongs are listed as a log. In this example, four logs (log 221, log 222, log 223, and log 224) are displayed. The log 221 indicates an operation on a note, and the logs 222 to 224 indicate operations on a dataset. Pressing buttons 225 at the right ends of the logs can display the objects (note and dataset). A button 226 is pressed to associate a dataset with a chapter. The details thereof will be described later.

Note that although FIG. 5 illustrates an example in which all logs are displayed in the log area 220, a log ("My Recent") related to one's own recent operation, an additional log ("Unlinked") of a new dataset that is not linked to a chapter, and a log ("Favorites") of an operation registered as a favorite can be switched and displayed.

Figure 8:
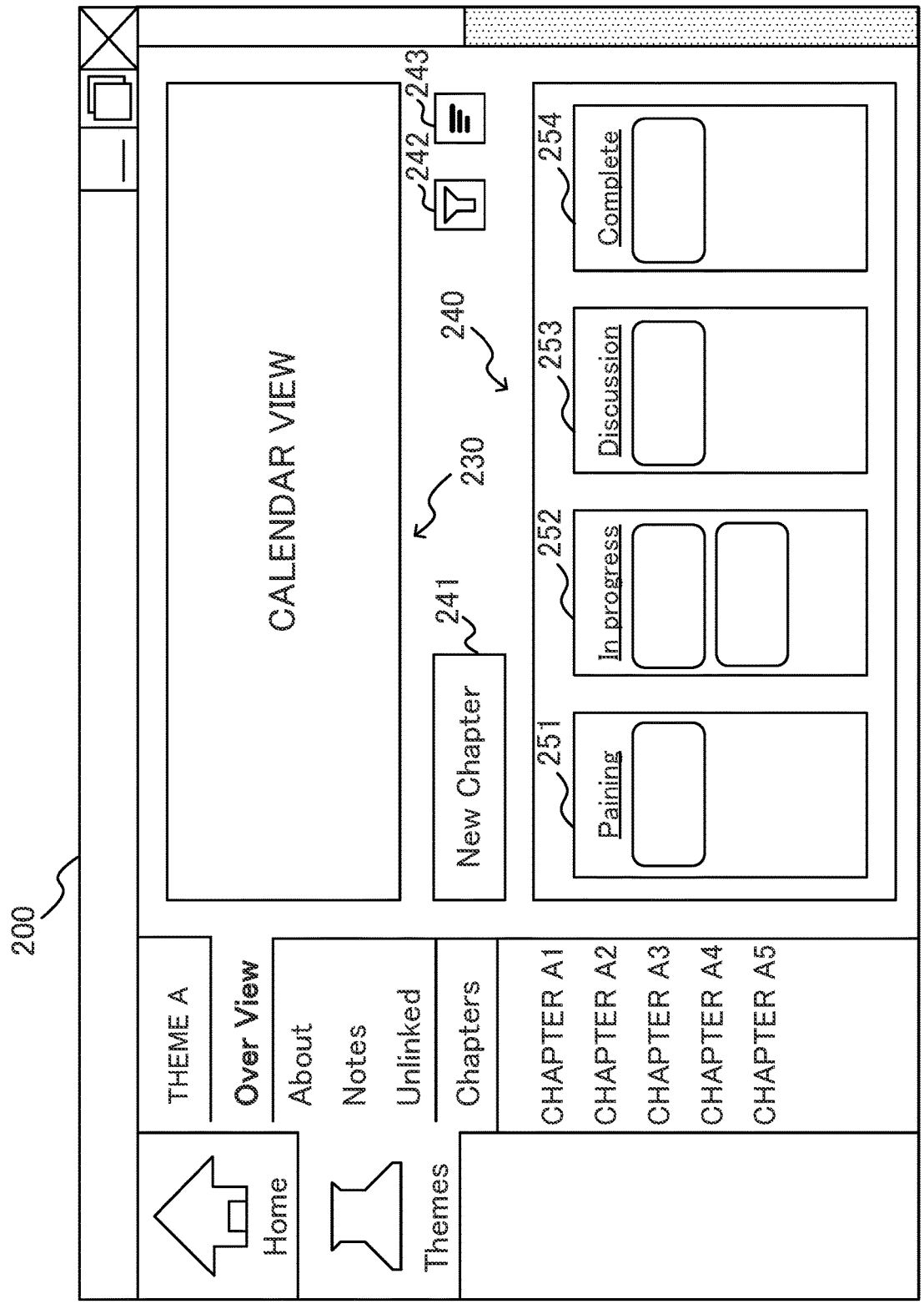
FIG. 8 is a diagram illustrating an example of a state in which a theme tab and an overview tab are selected within the window 200.

FIG. 8 is a diagram illustrating an example of a state in which a theme tab and an overview tab are selected within the window 200. Selecting the theme signboard 211 in the theme list area 210 displays the window 200 illustrated in FIG. 8. The theme tab further includes an overview tab, an about tab, a notes tab, an unlinked tab, and a chapters tab. In the overview tab, the window 200 is divided into a calendar view area 230 and a status display area 240.

Figure 9:
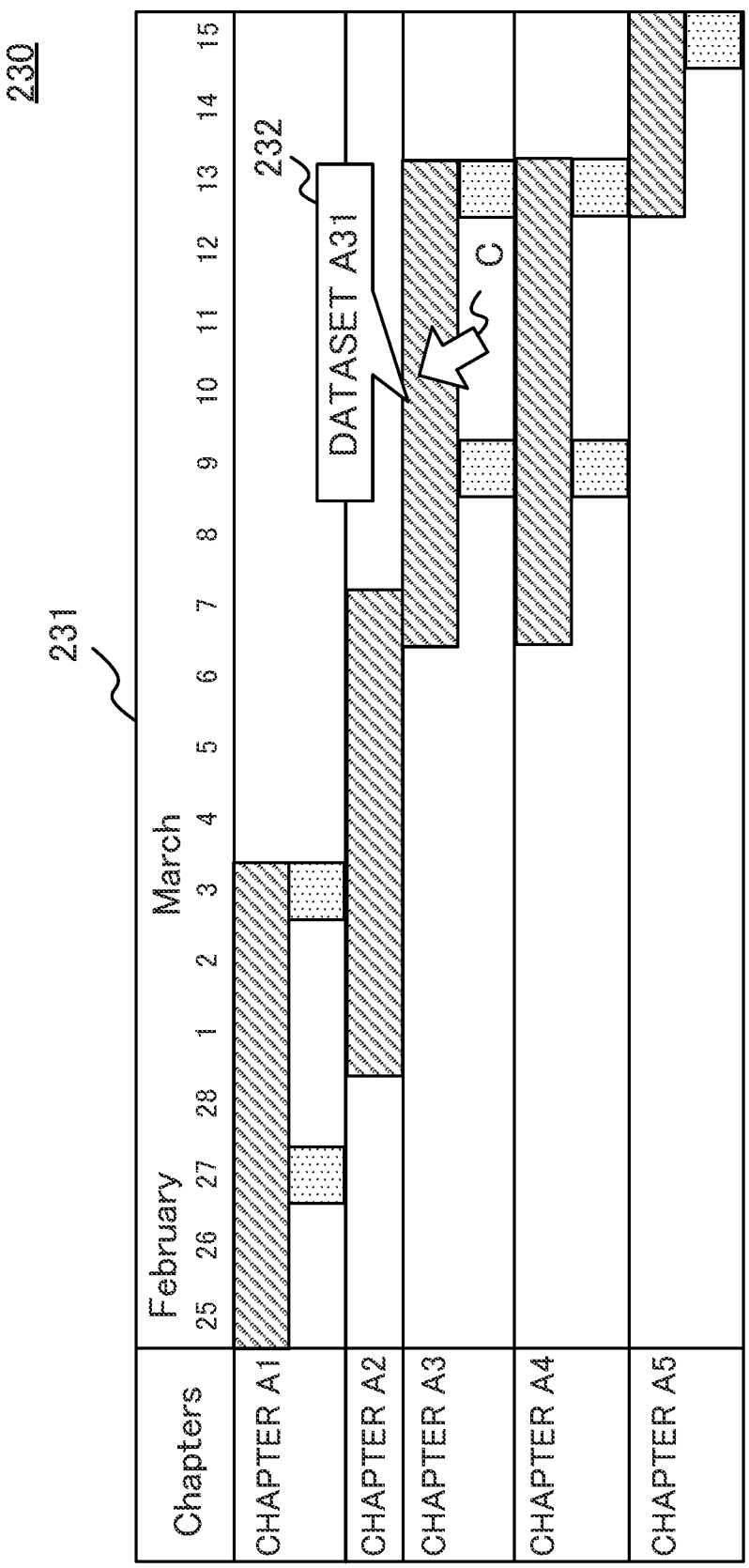
FIG. 9 is a diagram illustrating an example of a calendar view 231 displayed in a calendar view area 230.

FIG. 9 is a diagram illustrating an example of a calendar view 231 displayed in the calendar view area 230. In the calendar view 231, chapters within the theme are arranged on the vertical axis, and dates are arranged on the horizontal axis. Further, the chapter is divided into areas for each dataset associated with the chapter.

When measurement data is added to a dataset, an area corresponding to the added date in an area corresponding to the dataset in the calendar view 231 is highlighted. In other words, in the server device 100, the display control unit 130 displays the additional recording of the measurement data to the dataset associated with the chapter in a calendar format. Thus, in the calendar view 231, the date on which the measurement data is added to each dataset can be confirmed at a glance. Note that when a cursor C is placed on the area corresponding to the dataset, a balloon 232 including the dataset name may be displayed.

The status display area 240 includes a plurality of areas (a status area 251, a status area 252, a status area 253, and a status area 254) corresponding to a plurality of statuses, and a signboard (chapter signboard) representing a chapter within the theme. Further, in the status display area 240, a button 241 for creating a new chapter, an icon 242 for filtering chapters, and an icon 243 for sorting chapters are also provided.

In the status display area 240, the chapter signboard is displayed in an area corresponding to the status of the chapter. In other words, the display control unit 130 displays the chapter signboard in the status display area 240, more specifically, in an area corresponding to the status of the chapter represented by the chapter signboard. Thus, the logged-in user can confirm the status of each chapter at a glance. Note that in this example, the status display area 240 indicates areas corresponding to four statuses of "Planning", "In Progress", "Discussion", and "Complete".

Figure 10:
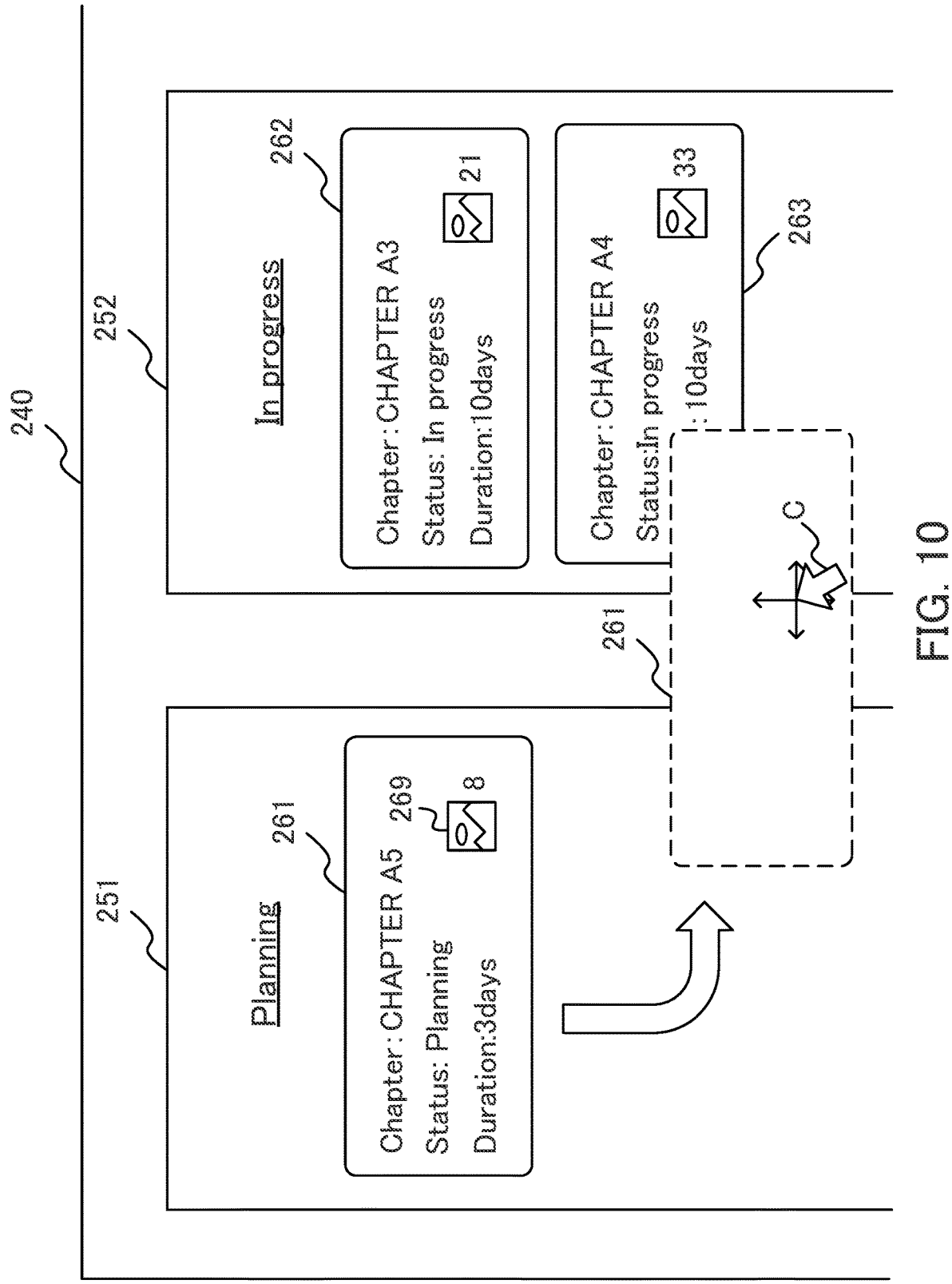
FIG. 10 is a diagram illustrating an example of a configuration of a chapter signboard.

FIG. 10 is a diagram illustrating an example of a configuration of a chapter signboard. The chapter signboard (chapter signboard 261, chapter signboard 262, and chapter signboard 263) describes the name of the chapter ("Chapter"), the status of the chapter ("Status"), the number of days elapsed since the last update ("Duration"), and others. The number of images in the chapter is described beside the icon indicating the image.

By confirming the chapter signboard, the logged-in user can grasp a name of the chapter, information related to an amount of data associated with the chapter (the number of images), and information related to freshness of the data associated with the chapter (the number of elapsed days) in addition to the status of the chapter, and can grasp the outline of the chapter. The chapter signboard serves as a shortcut to the dataset associated with the chapter, and selecting the chapter signboard lists the dataset associated with the chapter.

In order to change the status of a chapter, the logged-in user may move the chapter signboard corresponding to the chapter to an area corresponding to the changed status, as illustrated in FIG. 10. Thus, the status of the chapter is updated and managed with the changed status.

Figure 11:
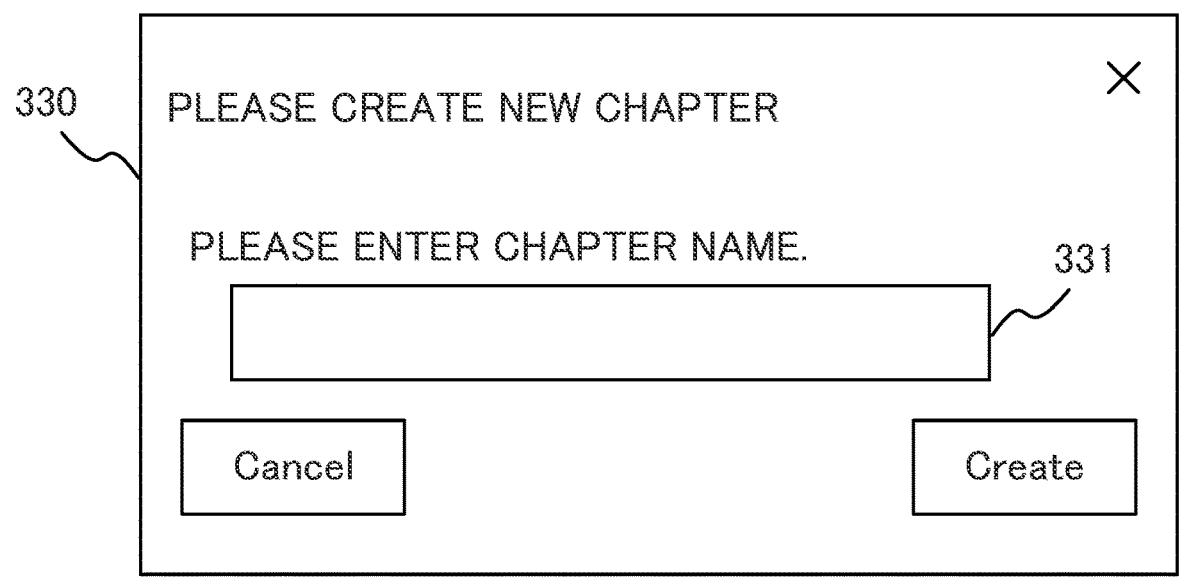
FIG. 11 is a diagram illustrating an example of a window 330 displayed when a chapter is created.
Figure 12:
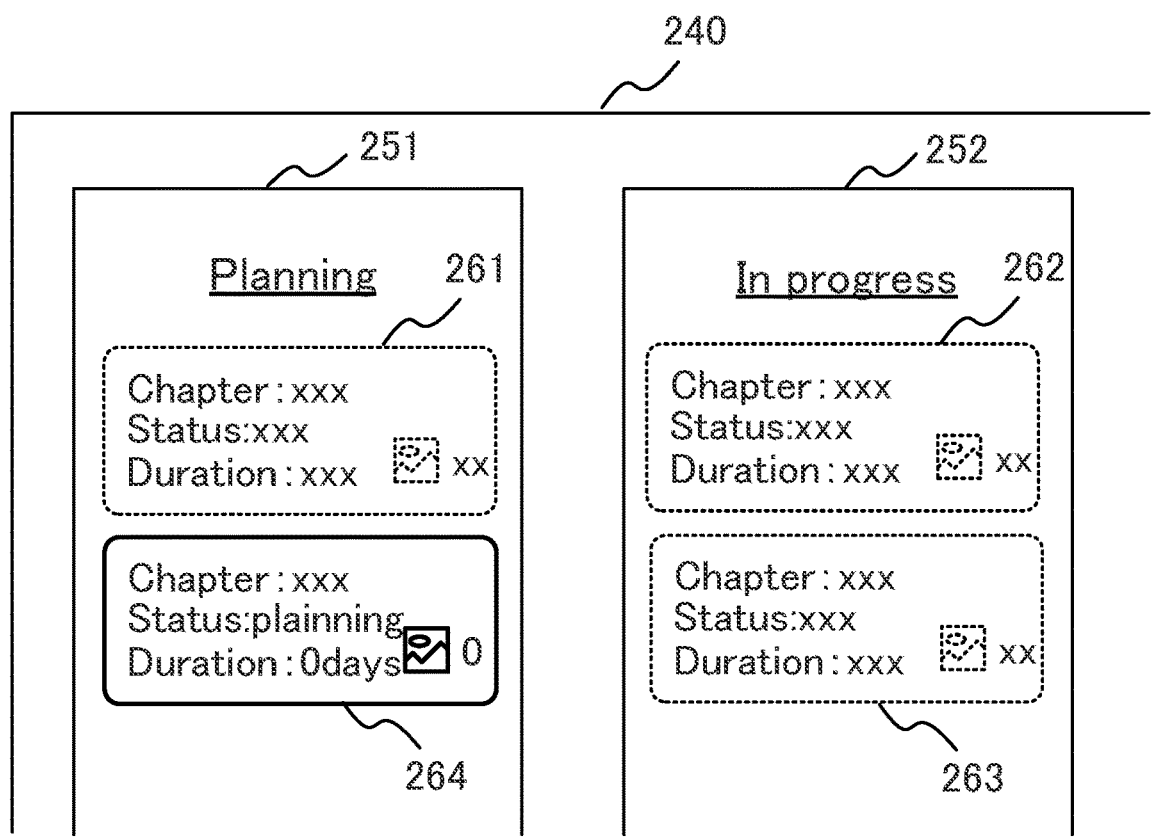
FIG. 12 is a diagram illustrating a state in which a new chapter signboard is displayed in a status area 251 after a chapter is created.

FIG. 11 is a diagram illustrating an example of a window 330 displayed when a chapter is created. FIG. 12 is a diagram illustrating a state in which a new chapter signboard is displayed in the status area 251 after a chapter is created. In order to start a new chapter, the button 241 may be pressed.

The logged-in user can easily create a chapter by inputting a chapter name in an input area 331 of the window 330 illustrated in FIG. 11 according to a guidance. The signboard of the newly created chapter (chapter signboard 264) is displayed in the status area 251 indicating the status "Planning" as illustrated in FIG. 12.

Figure 13:
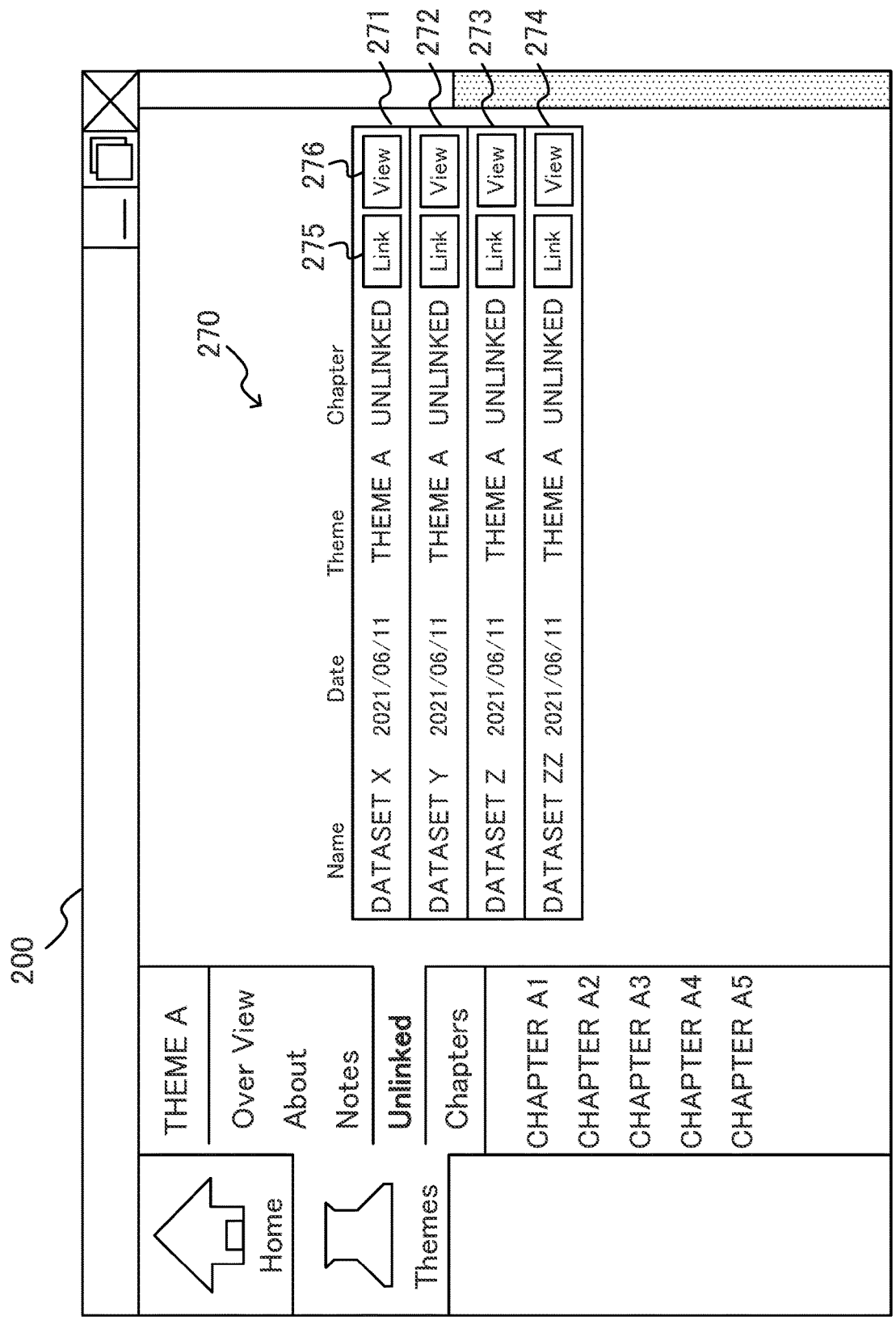
FIG. 13 is a diagram illustrating an example of a state in which datasets not linked to a chapter are listed within the window 200.

FIG. 13 is a diagram illustrating an example of a state in which datasets not linked to a chapter are listed within the window 200. Selecting the unlinked tab displays an unlinked data list area 270 illustrated in FIG. 13. The unlinked data list area 270 is an area in which datasets not linked to chapters are listed.

In this example, four datasets (dataset 271, dataset 272, dataset 273, and dataset 274) are displayed. Pressing the buttons 276 at the right edges of the datasets can display the images in the datasets. A button 275 is similar to the button 226 in FIG. 5, and is pressed to associate a dataset with a chapter.

Figure 14:
FIG. 14 is a diagram illustrating an example of a window 341 displayed when a dataset and a chapter are linked.
Figure 14:
Figure 14:
Figure 14:
Figure 14:
Figure 15:
FIG. 15 is a diagram illustrating an example of a window 342 displayed when a dataset and a chapter are linked.
Figure 15:
Figure 15:
Figure 15:

When the button 275 is pressed, for example, a window 341 illustrated in FIG. 14 in which chapters within a theme are listed is displayed, and a chapter to be associated with a dataset can be selected. Instead of the window 341, a window 342 illustrated in FIG. 15 may be displayed. Since chapters are organized and displayed for each status in the window 342, a chapter with which a dataset is associated can be selected while the status of the chapter is confirmed. Since there is a low possibility that a dataset is newly associated with a chapter whose status is "Complete", the chapter whose status is "Complete" may not be displayed as illustrated in FIG. 15. However, the display may be enabled by a user's selection.

Figure 16:
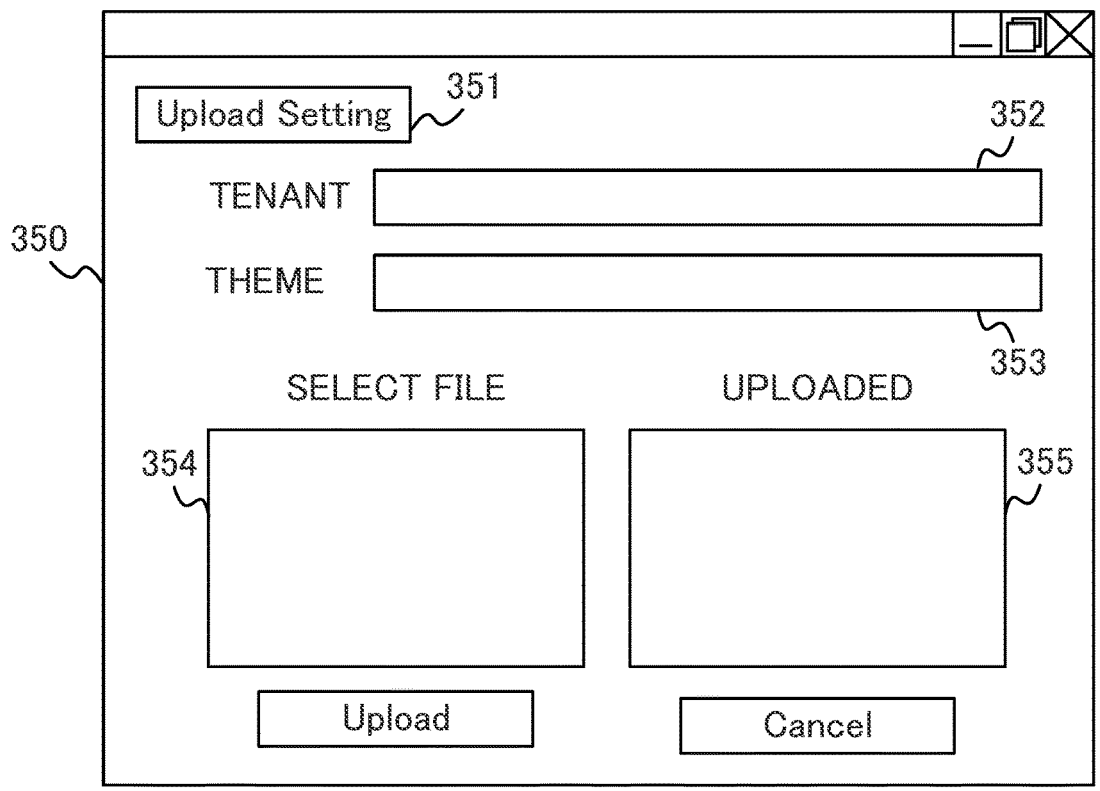
FIG. 16 is a diagram illustrating an example of a window 350 of a tool for uploading a dataset to the server device 100.
Figure 17:
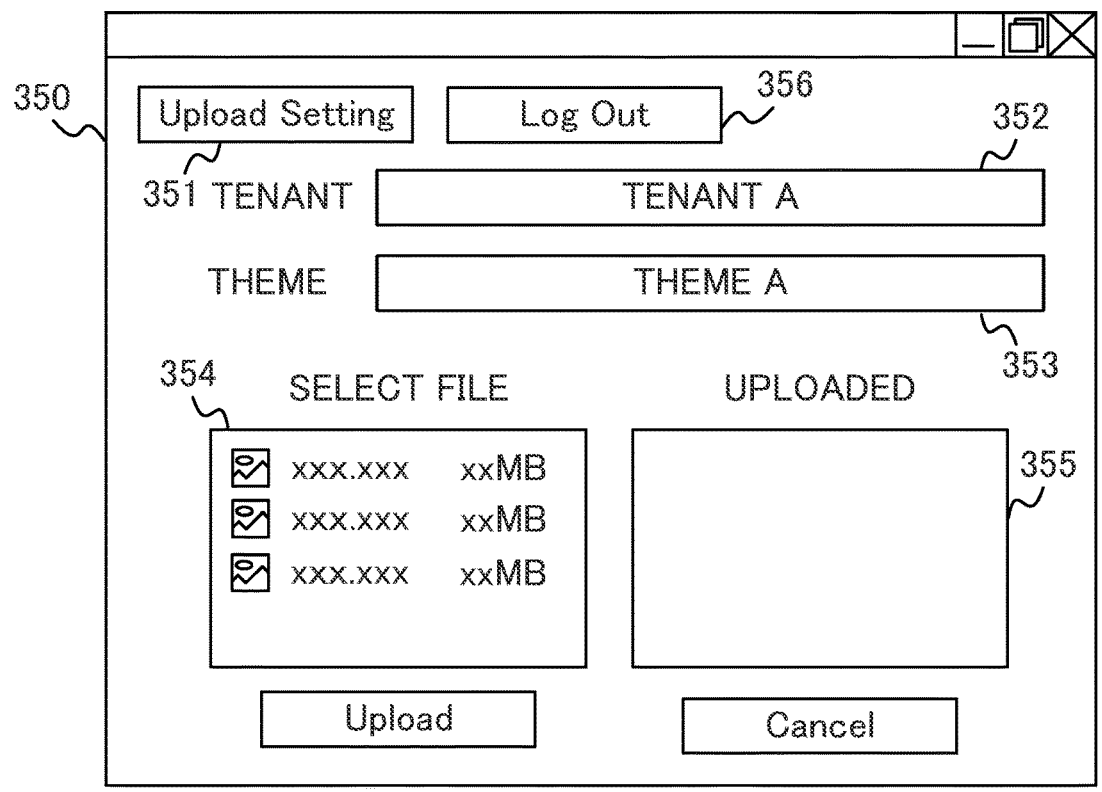
FIG. 17 is a diagram illustrating a state in which data to be uploaded is set in the window 350.

FIG. 16 is a diagram illustrating an example of a window 350 of a tool for uploading a dataset to the server device 100. FIG. 17 is a diagram illustrating a state in which data to be uploaded is set in the window 350. In order to upload the measurement data from the measurement system to the server device 100, for example, the tools illustrated in FIGS. 16 and 17 may be executed by the control device of the measurement system.

First, a button 351 within the window 350 displayed after execution is pressed to designate a tenant and a theme and log in to a service provided by the server device 100. When the login is successful, a logout button 356 is displayed in the window 350 as illustrated in FIG. 17. Then, as illustrated in FIG. 17, the measurement data to be uploaded to the server device 100 is input to an input area 354 to start uploading, whereby the measurement data is uploaded to the server device 100. The uploaded measurement data is displayed in a display area 355.

Figure 18:
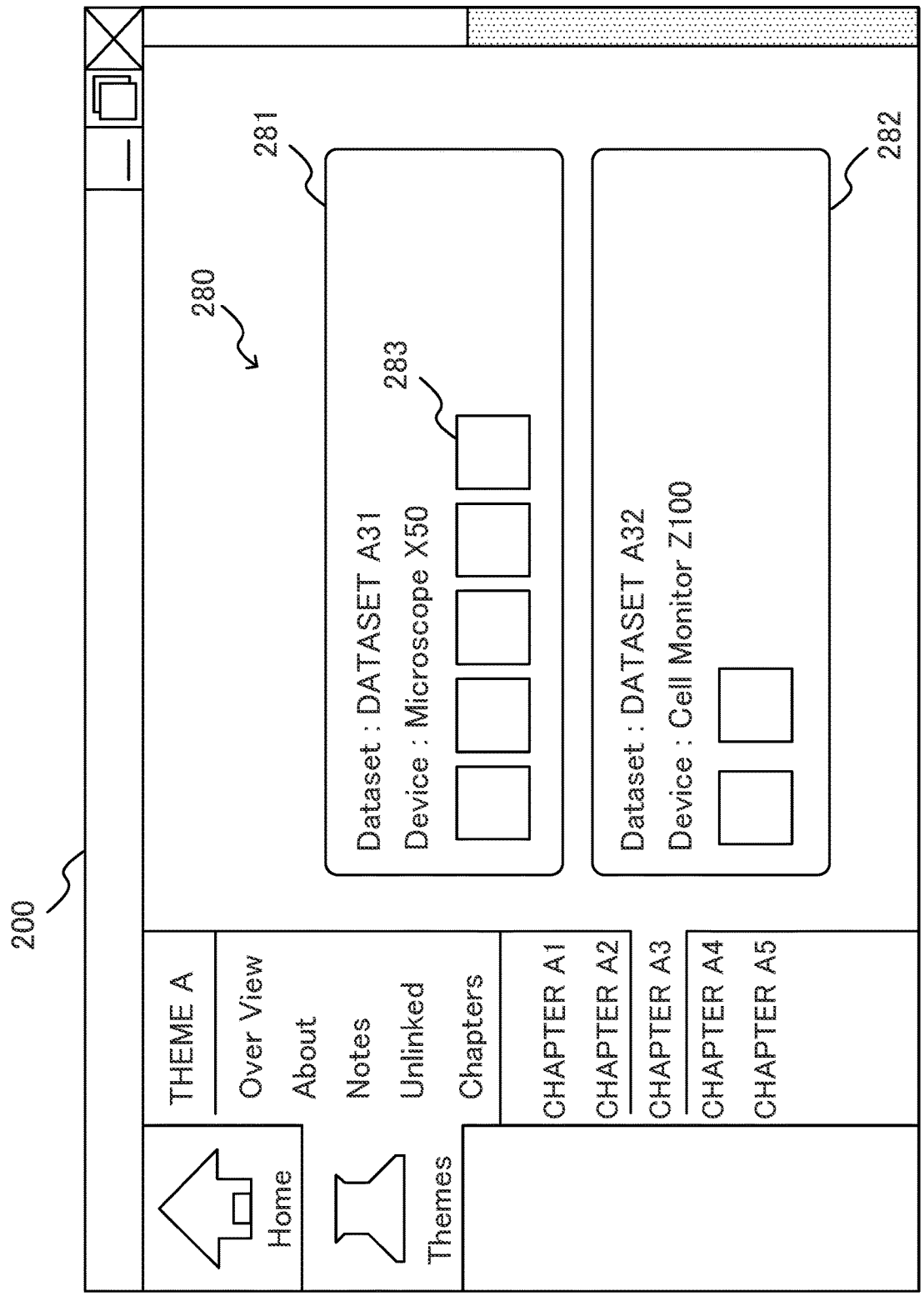
FIG. 18 is a diagram illustrating an example of a state in which datasets linked to a chapter A3 are listed within the window 200.

FIG. 18 is a diagram illustrating an example of a state in which datasets linked to a chapter A3 are listed within the window 200. Selecting a tab of a specific chapter (chapter A3) displays a dataset list area 280 illustrated in FIG. 18.

Alternatively, selecting a chapter signboard also displays the dataset list area in the same manner.

In the dataset list area 280, signboards (dataset signboard 281 and dataset signboard 282) corresponding to datasets associated with the chapter (chapter A3) are arranged. On the dataset signboard, the name of the dataset ("Dataset") and the device ("Device") from which the data in the dataset is acquired are described, and thumbnail images 283 of the images in the dataset are displayed. The dataset signboard serves as a shortcut to the measurement data in the dataset, and selection of the dataset signboard lists the measurement data in the dataset.

Figure 19:
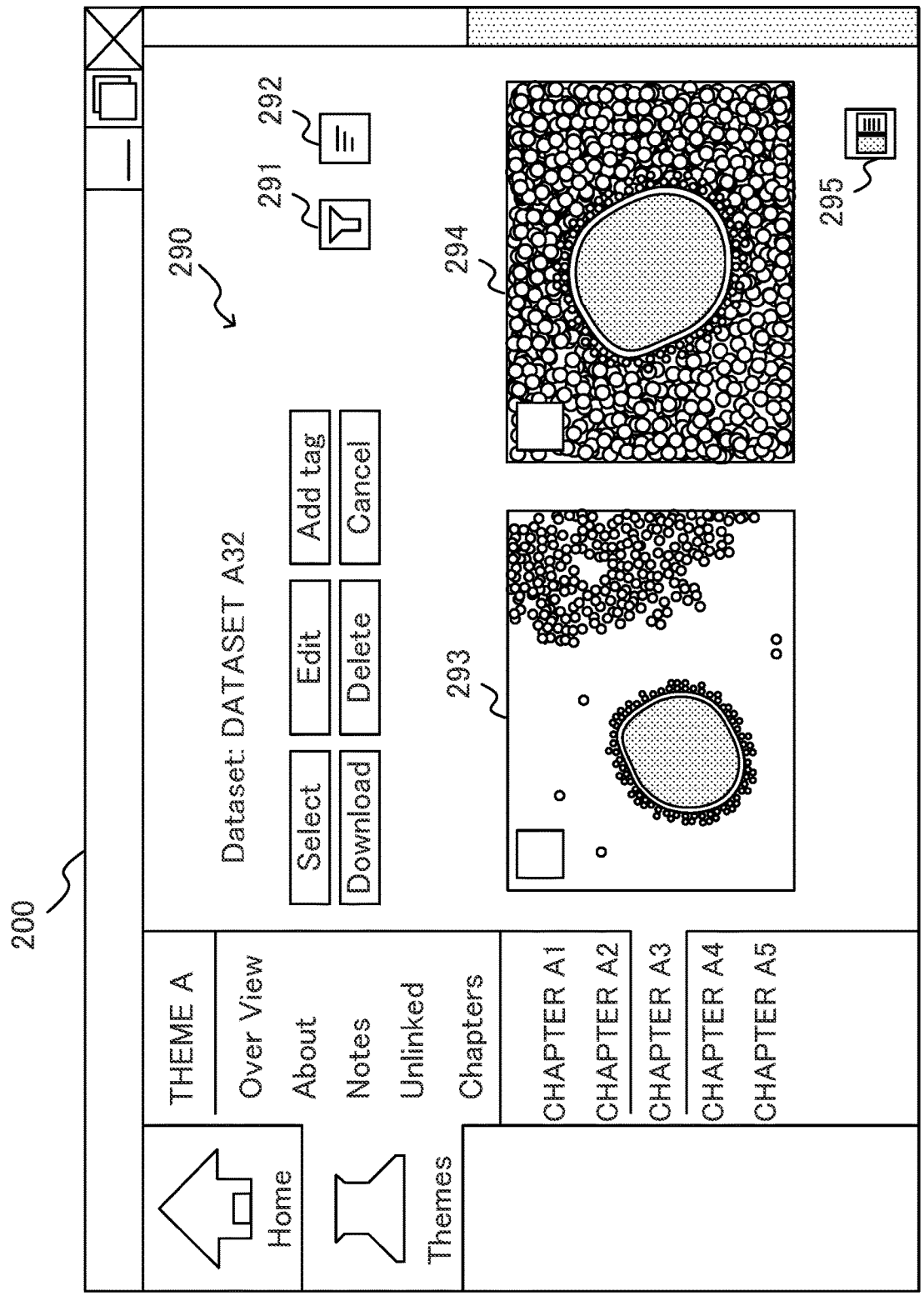
FIG. 19 is a diagram illustrating an example of a state in which images in a dataset A32 are listed within the window 200.

FIG. 19 is a diagram illustrating an example of a state in which images in a dataset A32 are listed within the window 200. Selecting the dataset signboard 282 displays a dataset area 290 illustrated in FIG. 19. In the dataset area 290, images (image 293 and image 294) which are measurement data in the dataset are arranged. In the dataset area 290, an icon 291 for filtering an image, an icon 292 for sorting an image, and an icon 295 for creating or editing a note are also provided together with a button group for performing various operations on an image.

Figure 20:
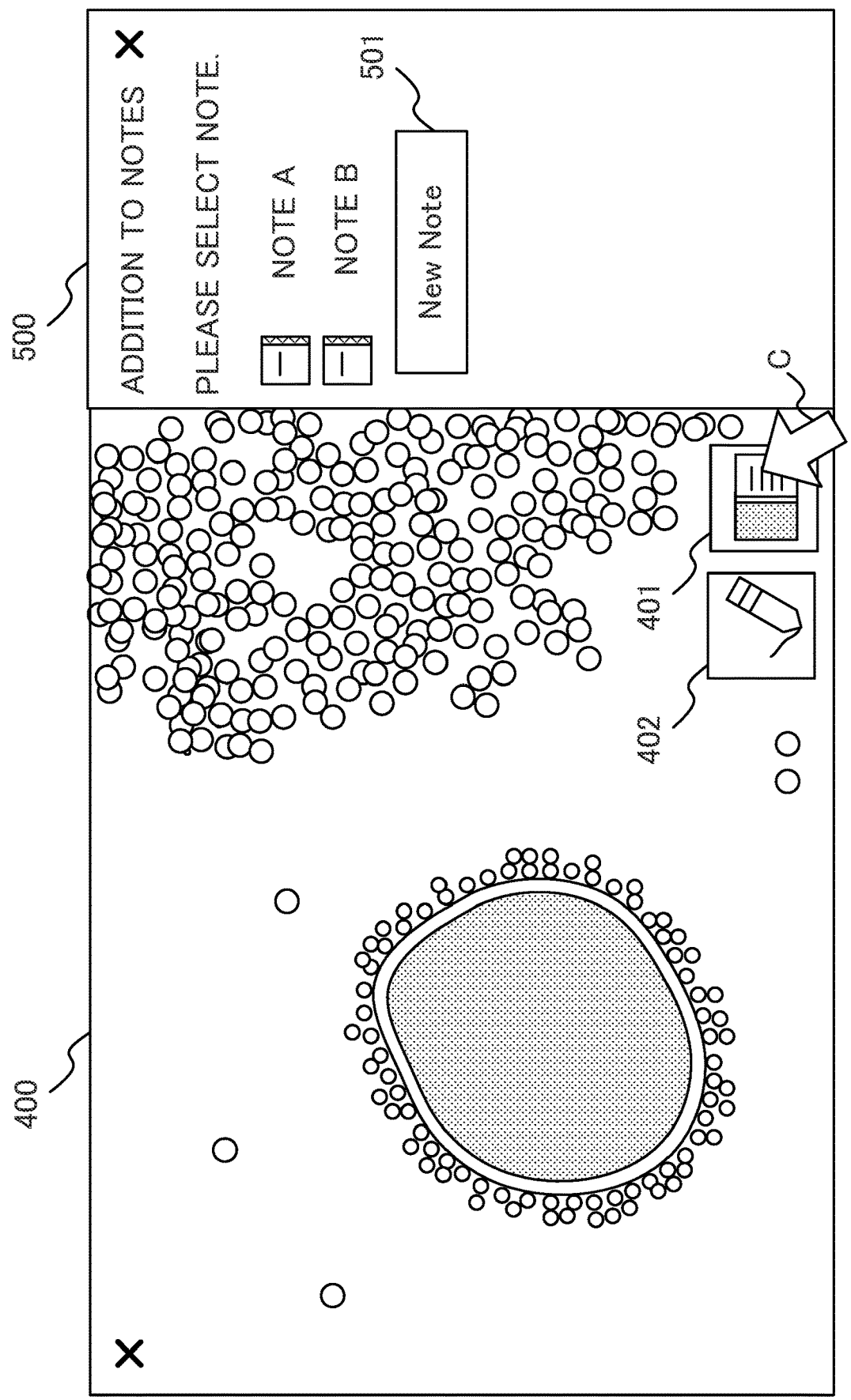
FIG. 20 is a diagram illustrating an example of a state in which a note is created while viewing an image 293.

FIG. 20 is a diagram illustrating an example of a state in which a note is created while viewing the image 293. When the image 293 in the dataset area 290 illustrated in FIG. 19 is selected, the image 293 is displayed in a window 400 as illustrated in FIG. 20. In the window 400, an icon 402 for editing an image and an icon 401 for creating or editing a note are also provided together with the image 293. Pressing the icon 401 displays a window 500 next to the window 400 as illustrated in FIG. 20. In the window 500, a list of existing notes and a button 501 for creating a new note are provided, and a note can be opened by selecting any one of the existing notes and the button.

Figure 21:
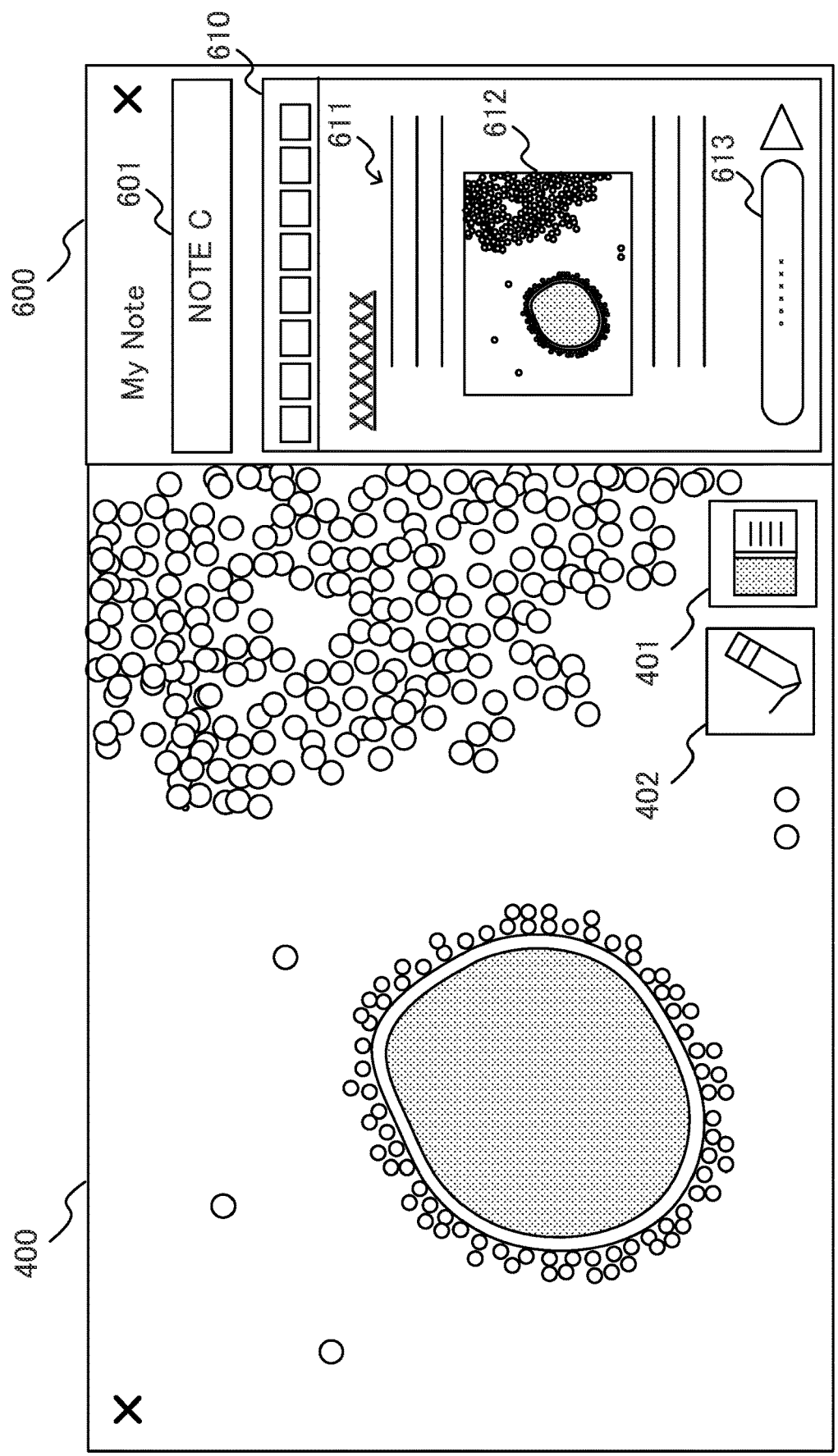
FIG. 21 is a diagram illustrating an example of a state in which information is written in a note.

FIG. 21 is a diagram illustrating an example of a state in which information is written in a note. When the button 501 in the window 500 illustrated in FIG. 20 is pressed to create a new note (note C), the window next to the window 400 is changed from the window 500 to a window 600 for displaying the note. The window 600 includes a display area 601 for displaying a note name and a note area 610.

Figure 22:
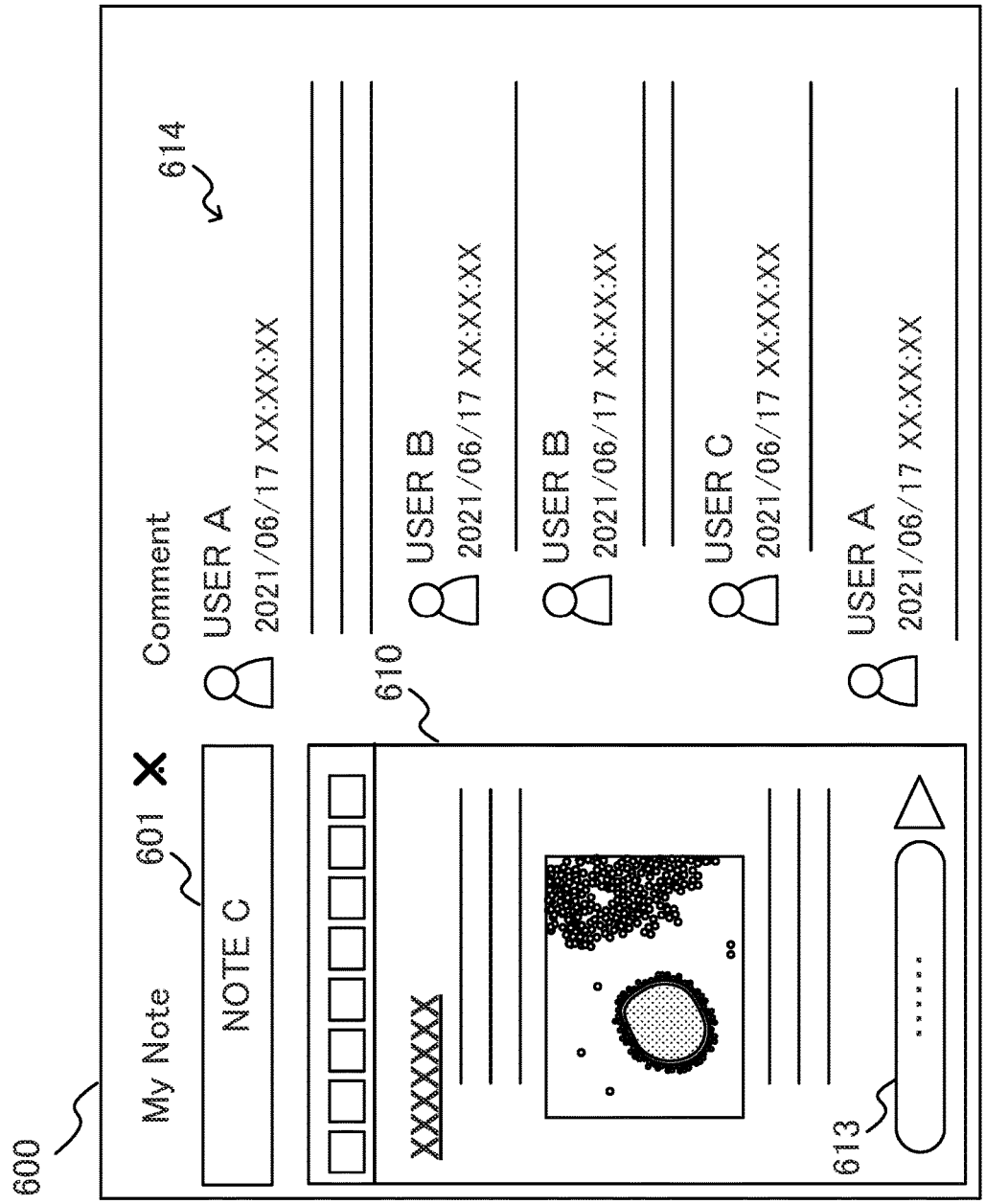
FIG. 22 is a diagram illustrating an example of a state in which a plurality of users is discussing the content of a note using a chat function.

As illustrated in FIG. 21, the user can freely write in the note area 610 using a text 611, an image 612, and others. Inputting a message into an input area 613 can also chat with other users. FIG. 22 is a diagram illustrating an example of a state in which a plurality of users is discussing the content of a note using a chat function. When a chat is performed from a note, a chat display area 614 is displayed in the window 600.

Figure 23:
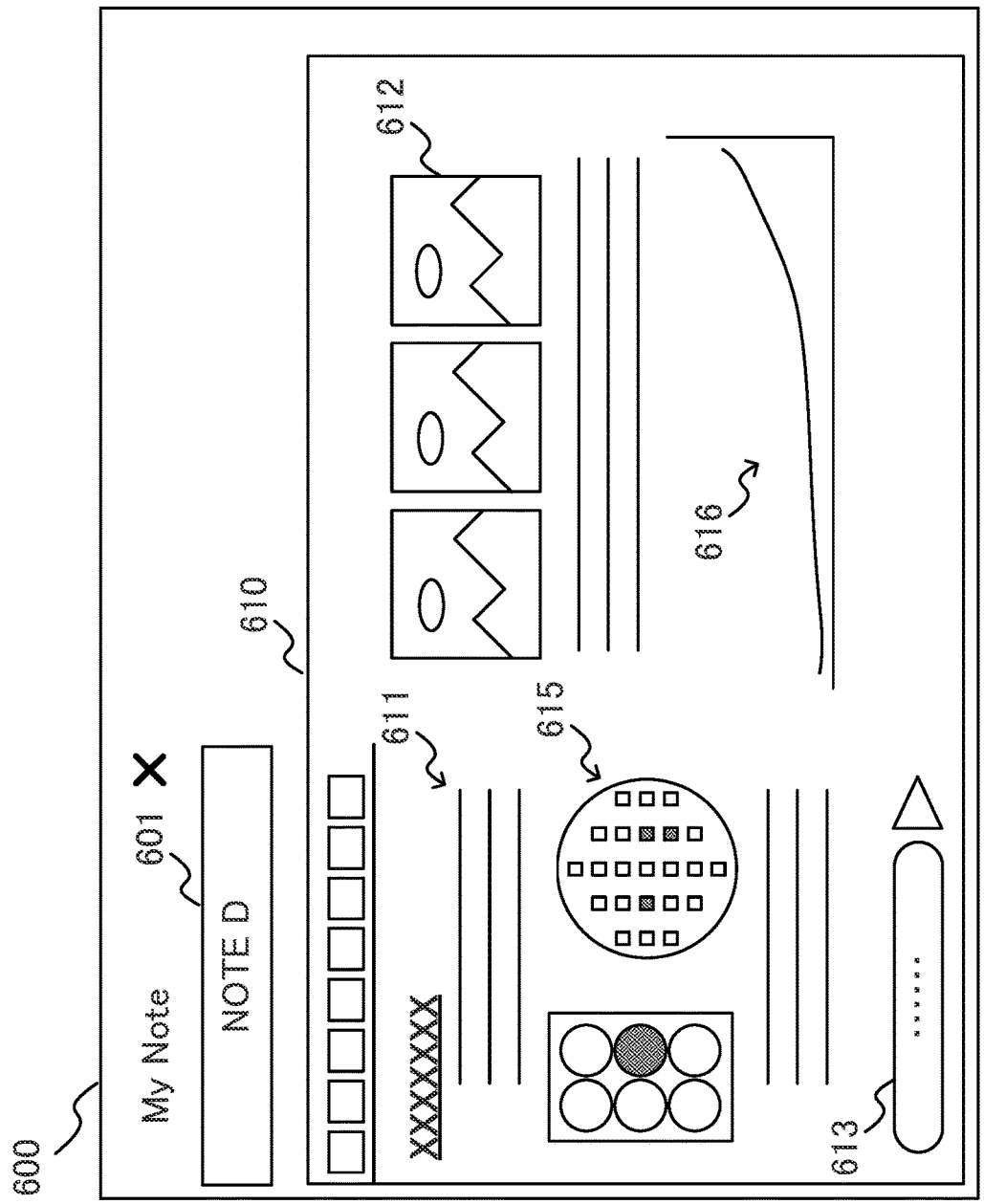
FIG. 23 is a diagram illustrating an example of another note.

FIG. 23 is a diagram illustrating an example of another note. Although FIG. 21 illustrates an example in which the note area 610 includes the text 611 and the image 612, the note area 610 may include setting information 615 obtained together with the image as measurement data, an analysis result 616 obtained by analyzing the image, or others. The setting information 615 is, for example, information included in the measurement data of the culture monitoring system 20 and indicates which well of a multi-well plate the image of the measurement data is captured and which position in the well the image of the measurement data is captured. The analysis result 616 is obtained by analyzing the time-lapse captured image and graphing the transition of the number of cells.

Figure 24:
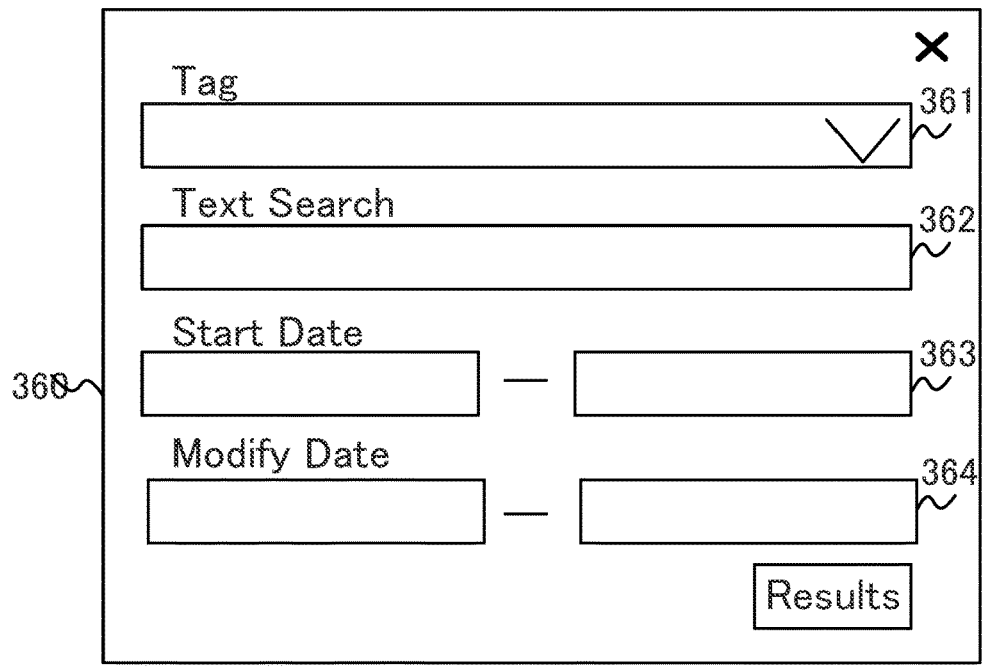
FIG. 24 is a diagram illustrating an example of a window 360 displayed when a chapter is narrowed down.

FIG. 24 is a diagram illustrating an example of a window 360 displayed when a chapter is narrowed down. Although FIG. 8 illustrates an example in which signboards of all chapters belonging to a theme are displayed in the status display area 240, the chapters to be displayed in the status display area 240 may be narrowed down by a filter.

Specifically, when the icon 242 is pressed, the window 360 illustrated in FIG. 24 is displayed. Designating the type of tag in the selection area 361 can narrow down chapters displayed in the status display area 240 to the chapters of the designated tag. Inputting arbitrary text in an input area 362 can narrow down chapters displayed in the status display area 240 to the chapters that include the input text in chapter names. Further, designating dates in an input area 363 and an input area 364 can narrow down chapters displayed in the status display area 240 to the chapters whose start date or update date corresponds to the designated dates.

Figure 25:
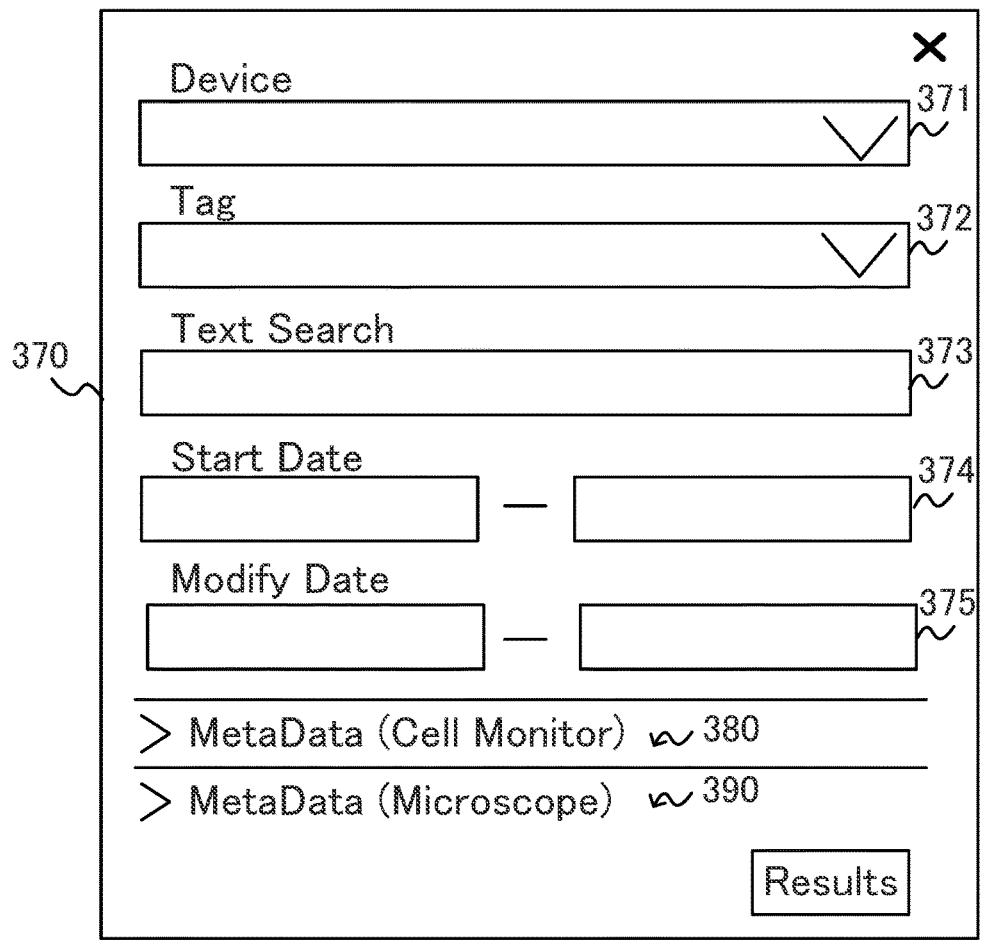
FIG. 25 is a diagram illustrating an example of a window 370 displayed when an image is narrowed down.

FIG. 25 is a diagram illustrating an example of a window 370 displayed when an image is narrowed down. Although FIG. 19 illustrates an example in which all the images in the dataset are displayed in the dataset area 290, the images displayed in the dataset area 290 may be narrowed down by a filter.

Specifically, when the icon 291 is pressed, the window 370 illustrated in FIG. 25 is displayed. The narrowing down of images can be performed by a tag (selection area 372), a text (input area 373), a start date (input area 374), an update date (input area 375), and others, in the same manner as the narrowing down of chapters. Further, the narrowing down can be performed by a device name (selection area 371) from which the image is acquired. In addition, images can be further narrowed down using metadata that constitutes the measurement data with the image. Since the metadata imparted to the image is different for each measurement system, when the image acquired by the culture monitoring system 20 is searched by the metadata, the condition is designated by a detailed setting 380, and when the image acquired by the microscope system 10 is searched by the metadata, the condition is designated by the detailed setting 390.

Figure 26:
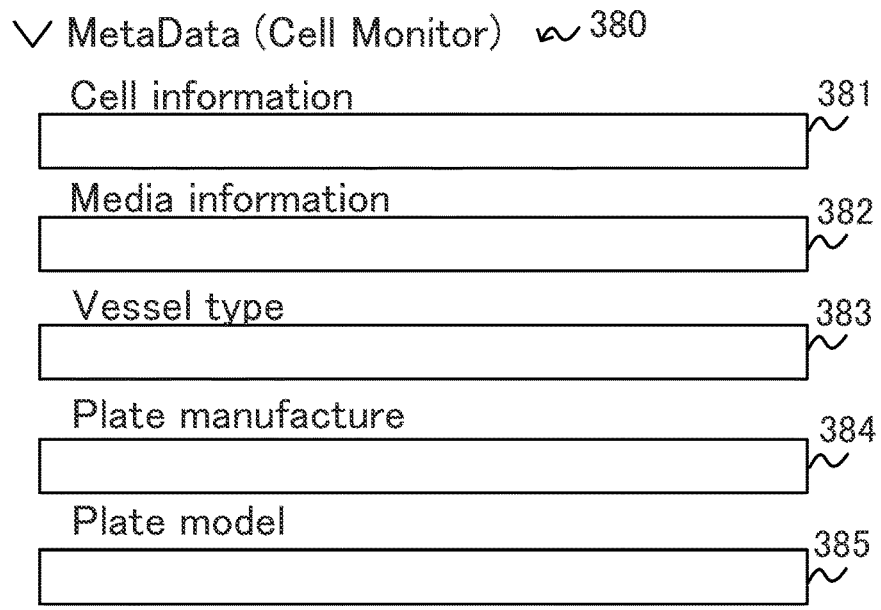
FIG. 26 is a diagram illustrating a state in which items of metadata for a cell monitor within the window 370 are expanded.

FIG. 26 is a diagram illustrating a state in which items of metadata for a cell monitor within the window 370 are expanded. As illustrated in FIG. 26, in the case of the culture monitoring system 20, images can be narrowed down using information (input area 381) of cells as a sample, information (input area 382) of a medium contained in a container, information (input area 383) of a container containing a sample, manufacturer information (input area 384) of plates sandwiching a sample, a model (input area 385) of plates sandwiching a sample, and others, which can be set as metadata at the time of image acquisition.

Figure 27:
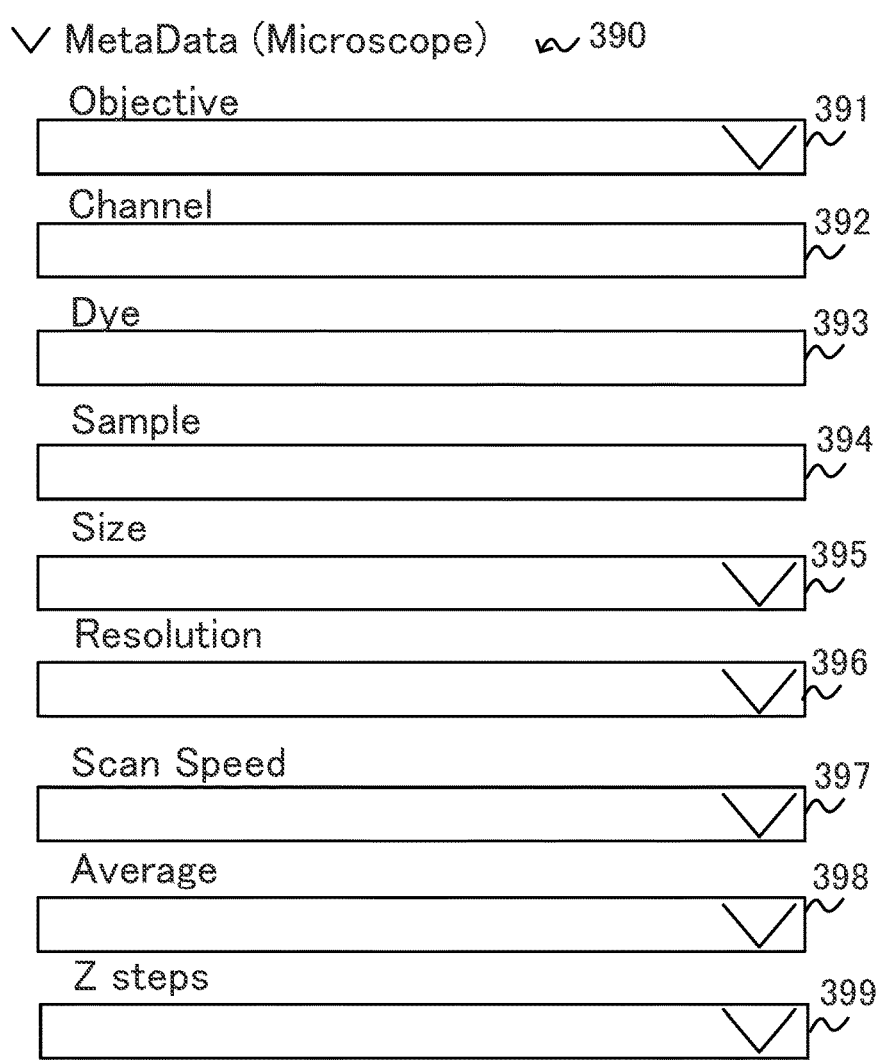
FIG. 27 is a diagram illustrating a state in which items of metadata for a microscope within the window 370 are expanded.

FIG. 27 is a diagram illustrating a state in which items of metadata for a microscope within the window 370 are expanded. As illustrated in FIG. 27, in the case of the microscope system 10, images can be narrowed down using objective lens information (selection area 391), channel information (input area 392), fluorescent dye information (input area 393), sample information (input area 394), image size information (selection area 395), image resolution information (selection area 396), scan speed information (selection area 397), average information (selection area 398), z-step information (selection area 399), and others, which can be set as metadata at the time of image acquisition.

Figure 28:
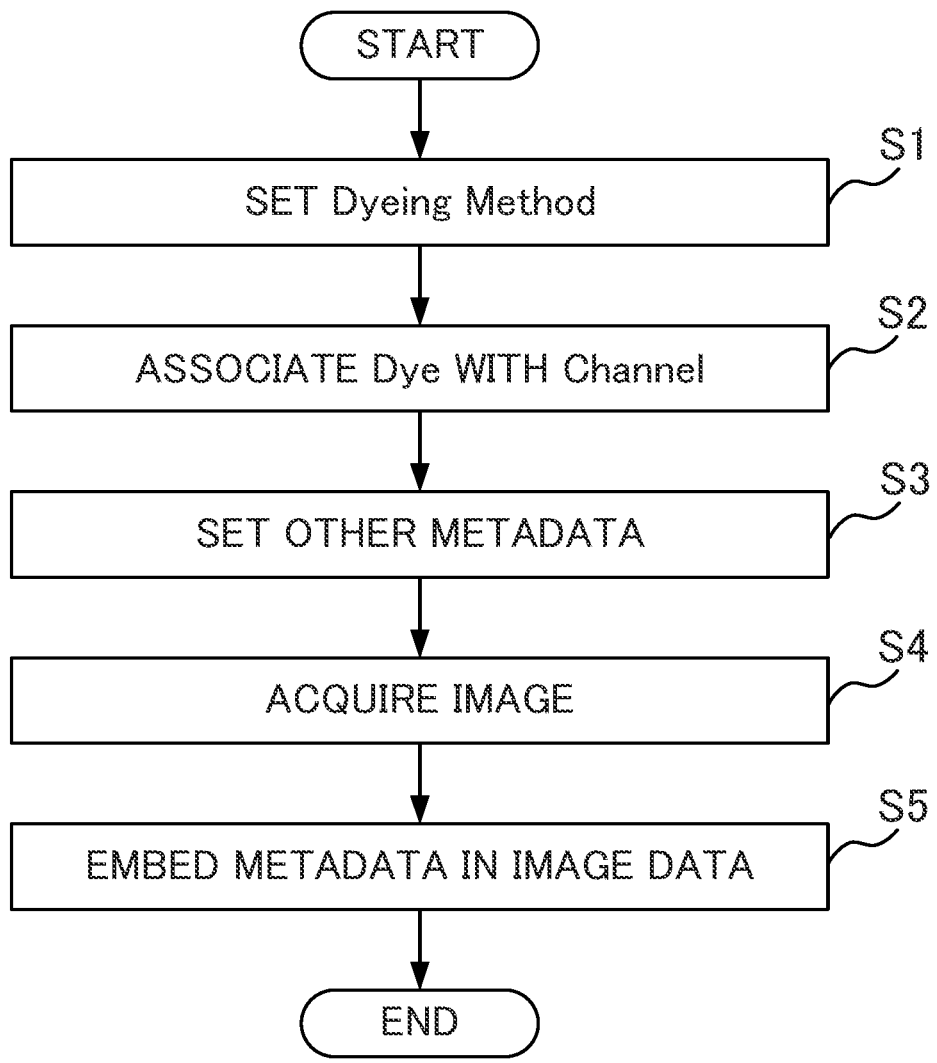
FIG. 28 is an example of a flowchart of a process of embedding metadata in image data by the measurement system.

FIG. 28 is an example of a flowchart of a process of embedding metadata in image data by the measurement system. Although the measurement data acquired by the measurement system includes an image accompanied by the metadata, as illustrated in FIGS. 26 and 27, the metadata includes data related to the setting of the measurement system (e.g., objective lens, resolution, scan speed, and z-step) and data related to the sample measured by the measurement system (e.g., cell information and fluorescent dye). A method of including information of Dye in metadata will be described below with reference to FIG. 28.

In the measurement system, DyeingMethod is first set in the device (step S1). The DyeingMethod is information that is later included in the measurement data as metadata, and can include various information related to fluorescence detection. The Dye in which the DyeingMethod is set is then associated with Channel of the measurement system (step S2). Further, other Channel-independent metadata is set (step S3). After the above setting is completed, an image is acquired (step S4). Finally, metadata is embedded in the image acquired in step S4 to create measurement data (step S5). According to this method, the DyeingMethod associated with the Channel used by the measurement system for image acquisition can be easily embedded as metadata. In other words, associating the DyeingMethod, which is data related to a sample, with the Channel, which is a system setting, enables data related to the sample to be included in the measurement data as metadata in addition to data related to the system setting.

The above embodiments are specific examples for facilitating understanding of the invention, and the present invention is not limited to these embodiments. Modifications obtained by modifying the above embodiments and alternative forms replacing the above embodiments can be included. In other words, in each embodiment, the components can be modified without departing from the spirit and the scope thereof. Further, a new embodiment can be implemented by appropriately combining the multiple components disclosed in one or more of the embodiments. Further, some components may be omitted from the components described in each embodiment, or some components may be added to the components described in the embodiment. Further, the order of the processing procedures in each embodiment may be changed as long as there is no contradiction. In other words, the data management system, the data management method, and the computer-readable medium of the present invention can be variously modified and changed without departing from the scope of the invention defined by the claims.

For example, although the above-described embodiment illustrates an example in which as illustrated in FIG. 10, the display control unit 130 displays the chapter signboard in the status display area 240 so as to be identifiable by character information, the chapter signboard may be displayed in the status display area 240 in at least one of a color, brightness, a pattern, and a shape corresponding to the status of the chapter represented by the chapter signboard.

What is claimed is:

1. A data management system comprising:
a measurement system connectable to a microscope; and
a processor,
wherein the processor is configured to:
classify a dataset based on meta information regarding at least one of measurement and an experiment using the microscope, the meta information including a setting of the microscope;
acquire, from the measurement system, measurement data uploaded by designating a theme that is a unit of access control, the measurement data including metadata having the meta information;
add, based on the metadata, the measurement data to the dataset within the theme;
associate the dataset with a chapter that represents a status of the dataset and is provided within the theme; and
display information about the dataset and the chapter.

2. The data management system according to claim 1, wherein
the processor displays a signboard representing the chapter and being a shortcut to the dataset associated with the chapter, in a status display area, wherein the signboard is a GUI (graphical user interface) element on which information about the chapter is displayed and which is selectable by a user to function as the shortcut to the dataset associated with the chapter.

3. The data management system according to claim 2, wherein
the status display area includes a plurality of areas corresponding to a plurality of statuses, and
the processor displays the signboard in an area corresponding to the status of the chapter represented by the signboard.

4. The data management system according to claim 2, wherein
the processor displays the signboard in the status display area in at least one of a color, brightness, a pattern, and a shape corresponding to the status of the chapter represented by the signboard.

5. The data management system according to claim 3, wherein
the processor displays the signboard in the status display area in at least one of a color, brightness, a pattern, and a shape corresponding to the status of the chapter represented by the signboard.

6. The data management system according to claim 2, wherein
the signboard includes:
a name of the chapter represented by the signboard;
information related to an amount of data associated with the chapter represented by the signboard; and
information related to freshness of data associated with the chapter represented by the signboard.

7. The data management system according to claim 3, wherein
the signboard includes:
a name of the chapter represented by the signboard;
information related to an amount of data associated with the chapter represented by the signboard; and
information related to freshness of data associated with the chapter represented by the signboard.

8. The data management system according to claim 4, wherein
the signboard includes:
a name of the chapter represented by the signboard;
information related to an amount of data associated with the chapter represented by the signboard; and
information related to freshness of data associated with the chapter represented by the signboard.

9. The data management system according to claim 5, wherein
the signboard includes:
a name of the chapter represented by the signboard;
information related to an amount of data associated with the chapter represented by the signboard; and
information related to freshness of data associated with the chapter represented by the signboard.

10. The data management system according to claim 1, wherein
the processor displays additional recording of the measurement data to the dataset associated with the chapter in a calendar format.

11. The data management system according to claim 2, wherein
the processor displays additional recording of the measurement data to the dataset associated with the chapter in a calendar format.

12. The data management system according to claim 3, wherein
the processor displays additional recording of the measurement data to the dataset associated with the chapter in a calendar format.

13. The data management system according to claim 4, wherein
the processor displays additional recording of the measurement data to the dataset associated with the chapter in a calendar format.

14. The data management system according to claim 5, wherein
the processor displays additional recording of the measurement data to the dataset associated with the chapter in a calendar format.

15. The data management system according to claim 1, wherein
the measurement data includes image data accompanied by the metadata, and
the metadata includes:
data related to a setting of the measurement system; and
data related to a sample measured by the measurement system.

16. The data management system according to claim 1, wherein
the processor manages a digital note created within the theme, and
the processor displays a user interface for adding the measurement data to the digital note.

17. The data management system according to claim 1, wherein the measurement system further includes a culture monitoring system including an imaging device that performs time-lapse imaging in an incubator.

18. A data management method performed by a computer of a data management system comprising a measurement system connectable to a microscope, the method comprising:
classifying a dataset based on meta information regarding at least one of measurement and an experiment using the microscope, the meta information including a setting of the microscope;
acquiring, from the measurement system, measurement data uploaded by designating a theme that is a unit of access control, the measurement data including metadata having the meta information;
adding, based on the metadata, the measurement data to the dataset within the theme;
associating the dataset with a chapter that represents a status of the dataset and is provided within the theme; and
displaying information about the dataset and the chapter.

19. A non-transitory computer-readable medium having a program recorded thereon for causing a computer of a data management system to execute a process, the data management system comprising a measurement system connectable to a microscope, the process comprising:
classifying a dataset based on meta information regarding at least one of measurement and an experiment using the microscope, the meta information including a setting of the microscope;
acquiring, from the measurement system, measurement data uploaded by designating a theme that is a unit of access control, the measurement data including metadata having the meta information;
adding, based on the metadata, the measurement data to the dataset within the theme;
associating the dataset with a chapter that represents a status of the dataset and is provided within the theme; and
displaying information managed by the data management system.

20. The data management system according to claim 3, wherein the plurality of statuses include statuses of planning, in progress, discussion, and complete.

21. The data management system according to claim 2, wherein:
the processor displays, in response to selection of the signboard representing the chapter such that the signboard functions as the shortcut, a dataset signboard representing the dataset associated with the chapter,
the dataset signboard is a GUI (graphical user interface) element which is selectable by a user to function as a shortcut to measurement data included in the dataset, and
the processor displays, in response to selection of the dataset signboard such that the dataset signboard functions as the shortcut to the measurement data, the measurement data included in the dataset.

* * * * *